(12) United States Patent
Heinzerling

(10) Patent No.: US 9,081,935 B2
(45) Date of Patent: Jul. 14, 2015

(54) ESTABLISHING AVAILABILITY OF A TWO-ENGINE AIRCRAFT FOR AN ETOPS FLIGHT OR AN ETOPS FLIGHT PATH FOR A TWO-ENGINE AIRCRAFT

(71) Applicant: The Boeing Company, Seal Beach, CA (US)

(72) Inventor: Daryl W. Heinzerling, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/187,351

(22) Filed: Feb. 24, 2014

(65) Prior Publication Data

US 2014/0172390 A1    Jun. 19, 2014

Related U.S. Application Data

(63) Continuation of application No. 14/172,458, filed on Feb. 4, 2014, which is a continuation-in-part of application No. 12/877,951, filed on Sep. 8, 2010, now Pat. No. 8,700,363.

(51) Int. Cl.
*G06F 17/18* (2006.01)
*G06F 17/50* (2006.01)
(Continued)

(52) U.S. Cl.
CPC ............ *G06F 17/5095* (2013.01); *G01C 21/20* (2013.01); *G06F 17/18* (2013.01); *G08G 5/0052* (2013.01); *G08G 5/003* (2013.01)

(58) Field of Classification Search
None
See application file for complete search history.

(56) References Cited

U.S. PATENT DOCUMENTS 5,586,252 A    12/1996    Barnard et al.
6,631,384 B1   10/2003    Richman et al.
(Continued)

FOREIGN PATENT DOCUMENTS

EP    1 243 895 A2    9/2002
EP    1 378 916 A2    1/2004
(Continued)

OTHER PUBLICATIONS

Dept. of Transportation, FAA, Federal Register, vol. 68, No. 114, pp. 35335-35345 (Friday, Jun. 13, 2003).*

(Continued)

*Primary Examiner* — Kamini S Shah
*Assistant Examiner* — Jay B Hann
(74) *Attorney, Agent, or Firm* — Womble Carlyle Sandridge & Rice, LLP

(57) ABSTRACT

A method is provided for establishing availability of a two-engine aircraft for a predefined ETOPS flight. The method may include calculating a probability of a dual independent engine shutdown sequence for each of a climb phase, a plurality of cruise phases including an ETOPS phase, and a descent phase into which the predefined ETOPS flight is divisible. The shutdown sequence may be composed of events that for each phase may include events having respective, conditional probabilities specific to a model of the two-engine aircraft, a product of which is the probability of the shutdown sequence for the respective phase. The method may include calculating the risk of the shutdown sequence as a function of a sum of the probabilities for the phases, and establishing availability of the aircraft based on the risk and a preexisting baseline. A similar method is provided for establishing availability of an ETOPS flight path.

15 Claims, 16 Drawing Sheets

(51) Int. Cl.
*G08G 5/00* (2006.01)
*G01C 21/20* (2006.01)

(56) References Cited

U.S. PATENT DOCUMENTS

| | | | |
|---|---|---|---|
| 8,700,363 B2* | 4/2014 | Heinzerling | 703/2 |
| 2005/0021212 A1 | 1/2005 | Gayme et al. | |
| 2007/0150124 A1 | 6/2007 | Wipplinger et al. | |
| 2008/0312783 A1 | 12/2008 | Mansouri et al. | |
| 2009/0150012 A1* | 6/2009 | Agam et al. | 701/3 |

FOREIGN PATENT DOCUMENTS

| | | |
|---|---|---|
| WO | WO 03/005376 A1 | 1/2003 |
| WO | WO 2006/123971 A2 | 11/2006 |

OTHER PUBLICATIONS

Mock, Mike "ETOPS Flight Operations Overview" Boeing (2009).*
Code of Federal Regulations, Title 14, sections 91.153, 121.374 (2010), 5 pages.
Easton et al., "Statistics Glossary" (2008) available at http://www.stats.gla.ac.uk/steps/glossary/probability.html, 7 pages.
Ekstrand, "The New FAA ETOPS Rule," 2007, Boeing.Com/Commercial/aeromagazine, Aero Quarterly, QTR_02 / 07, 8 pages.
Simpson et al., "A Review of Extended-Range Operations by Transport Aircraft" Flight Transportation Laboratory, MIT, FTL Report R87-9 (1987), 48 pages.
European Search Report dated Nov. 12, 2013 for European Application No. 11 180 579.2, 7 pages.
"Extended Range Operation with Two-Engine Aeroplanes ETOPS Certification and Operation," European Aviation Safety Agency Ed Decision No. 2003/12/RM on General Acceptable Means of Compliance for Airworthiness of Products, Parts and Appliances, AMC 20, Part AMC 20-6, XP-002714522, Nov. 5, 2003, retrieved on Oct. 8, 2013 from http://www.easa.europa.eu/agency-measures/docs/agency-decisions/2010/2010-012-R/Annex%20II%20-%20AMC%2020-6.pdf, 66 pages.
FAA Advisory Circular 25.1309-1A "System Design and Analysis," Jun. 21, 1988, 19 pages.
FAA Advisory Circular 39-8 "Continued Airworthiness Assessments of Powerplant and Auxiliary Power Unit Installations of Transport Category Airplanes," Sept. 8, 2003, 99 pages.
FAA Advisory Circular 120-42B "Extended Operations (ETOPS and Polar Operations)," Jun. 13, 2008, 70 pages.
"ETOPS Explained, An Overview of Extended Operations by Boeing Commercial Airplanes," Feb. 15, 2008, 199 pages.

* cited by examiner

PROBABILITY OF FAILURE SEQUENCE DURING THE ETOPS PHASE:
P3 = P3a P3b P3c

| | | Current Value (Time in hours) | Range (Time in hours) Min. | Range (Time in hours) Max. | | Optional Default Values (Time in hours) |
|---|---|---|---|---|---|---|
| Planned Total Flight Time | $T_T$ | 9.1 | 2.0 | 20.0 | | 3.0 |
| ETOPS Rules Time | $T_R$ | 3.0 | 1.0 | 8.0 | | 1.0 |
| ETOPS Threshold Time | $T_E$ | 1.0 | 1.0 | 3.0 | | 0.333 |
| | $T_1$ | 0.333 | 0.200 | 1.000 | | |
| Average duration of the Climb phase. | | | | | | |
| Projected time to land following an engine shutdown while in Climb phase. | $T_{A1}$ | 0.7 | 0.1 | 1.0 | | 0.7 |
| Normal time duration of the Non-ETOPS Early Cruise phase. | $T_2$ | 2.0 | 0.667 | 7.1 | | 2.0 |
| Projected single-engine time to land while in the Non-ETOPS Early Cruise phase. | $T_{A2}$ | 0.775 | 0.250 | 1.000 | | |
| Normal time duration of the ETOPS phase. | $T_3$ | 4.350 | 0.0 | 7.1 | | |
| Projected single-engine time to land while in ETOPS phase. | $T_{A3}$ | 2.088 | 0.417 | 3.0 | TA3 is the lesser of: 2.088 \| 2.200 | 2.0 |
| Normal time duration of the Non-ETOPS Late Cruise phase. | $T_4$ | 2.0 | 0.583 | 7.1 | | |
| Projected single-engine time to land while in Non-ETOPS Late Cruise phase. | $T_{A4}$ | 0.709 | 0.417 | 1.0 | | |
| | $T_5$ | 0.417 | 0.417 | 0.417 | | 0.417 |
| Projected single-engine time to land while in Descent phase. | $T_{A5}$ | 0.2085 | 0 | 0.417 | | |

| | | | | |
|---|---|---|---|---|
| Climb-Phase Engine Shutdown Rate | $r_1$ | 2.9E-05 | 7.40 | Climb ratio |
| Cruise-Phase Engine Shutdown Rate | $r_2$ | 1.76E-06 | 0.44 | Cruise ratio |
| Descent-Phase Engine Shutdown Rate | $r_3$ | 6.40E-06 | 1.60 | Descent ratio |

These 3 factors times the total IFSD Rate $K_F$ = the period engine shutdown rates $r_1$, $r_2$ and $r_3$ based on recent experience

| | | | |
|---|---|---|---|
| Single-Engine-Cruise Shutdown-Stress Factor (default=2) | $K_1$ | 2 | 2 |
| Ratio of hard climb IFSD rate to total climb IFSD rate (default=0.87) | $K_{NI}$ | 0.870 | 0.87 |
| Ratio of hard cruise IFSD rate to total cruise IFSD rate (default=0.78) | $K_N$ | 0.780 | 0.78 |
| Ratio of hard descent IFSD rate to total descent IFSD rate (default=1) | $K_{ND}$ | 1.000 | 1.00 |
| Ratio of single-engine descent time to two-engine descent time | $K_S$ | 0.6 | |
| User setable IFSD rate | $K_F$ | 0.004 | 0.004 |

FIG. 10

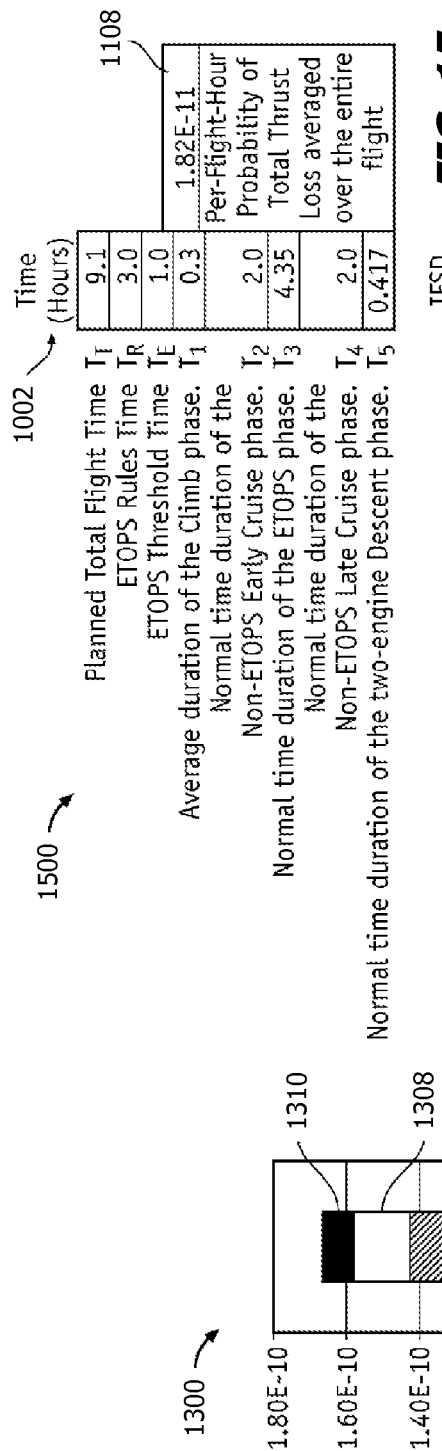
FIG. 13
FIG. 14
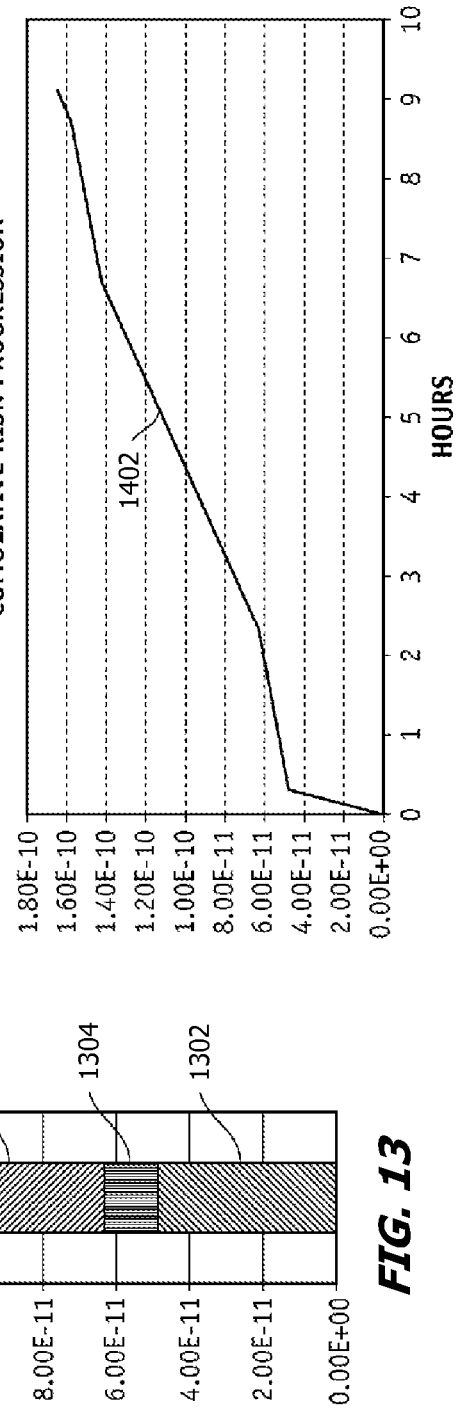
FIG. 15

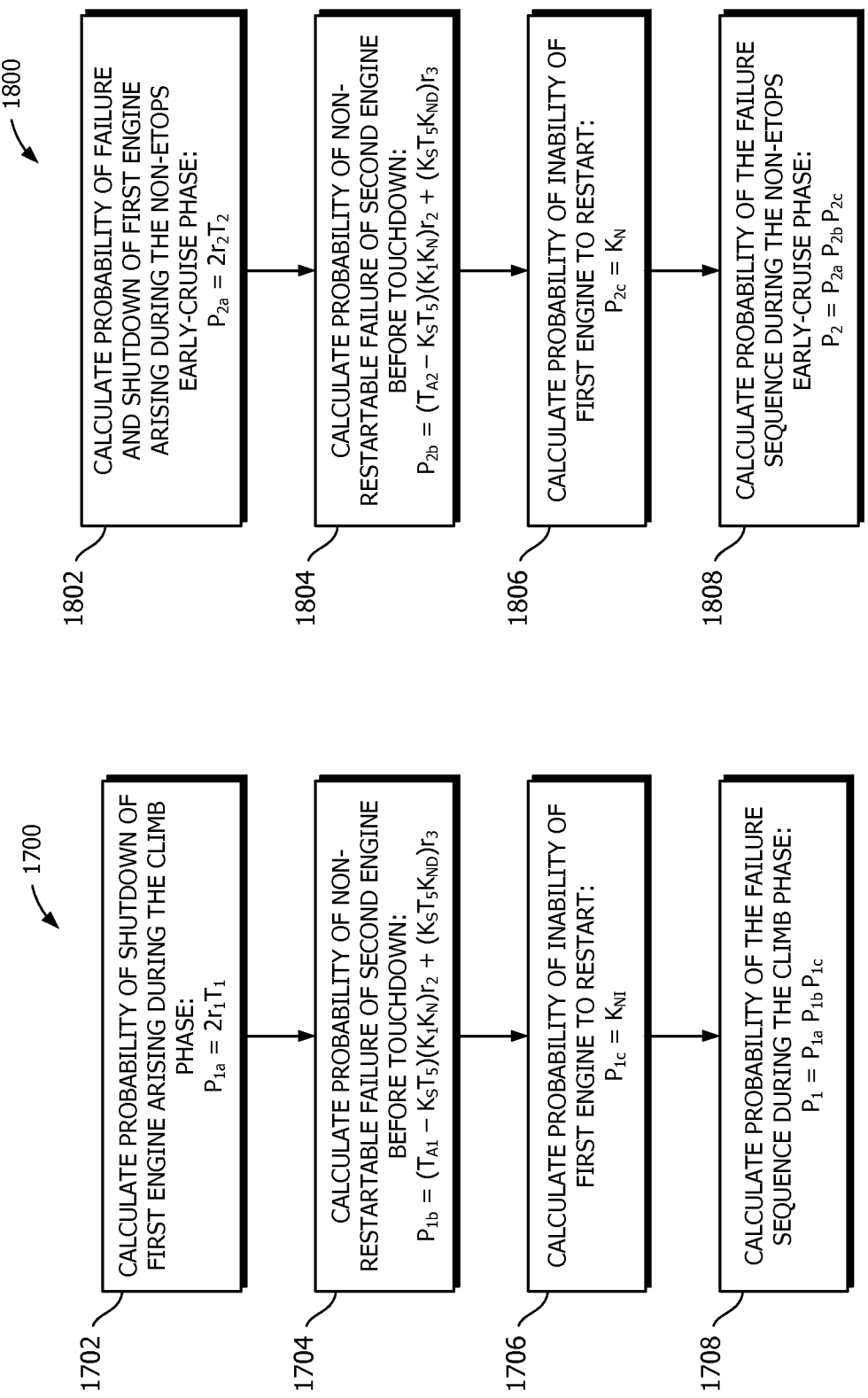

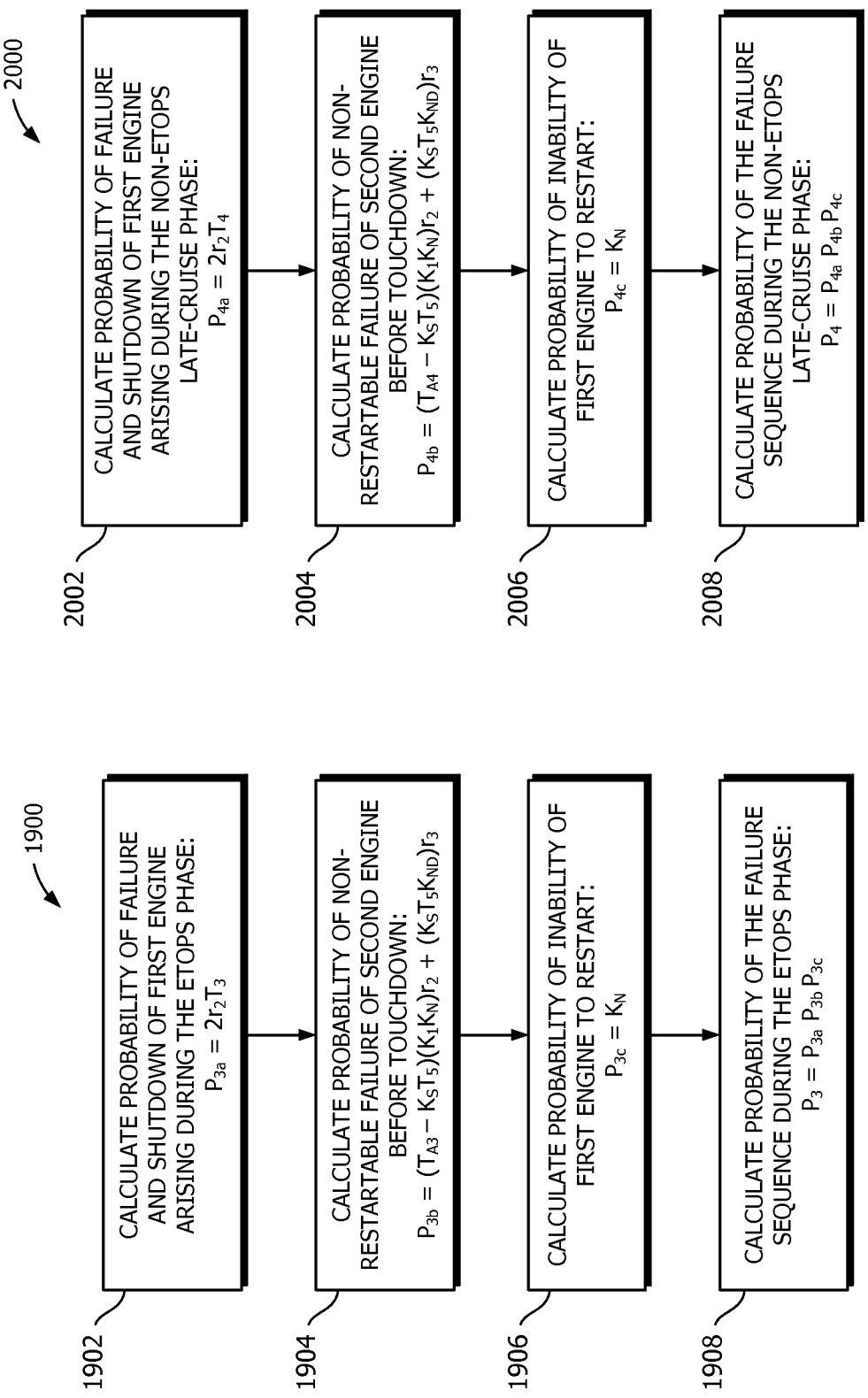

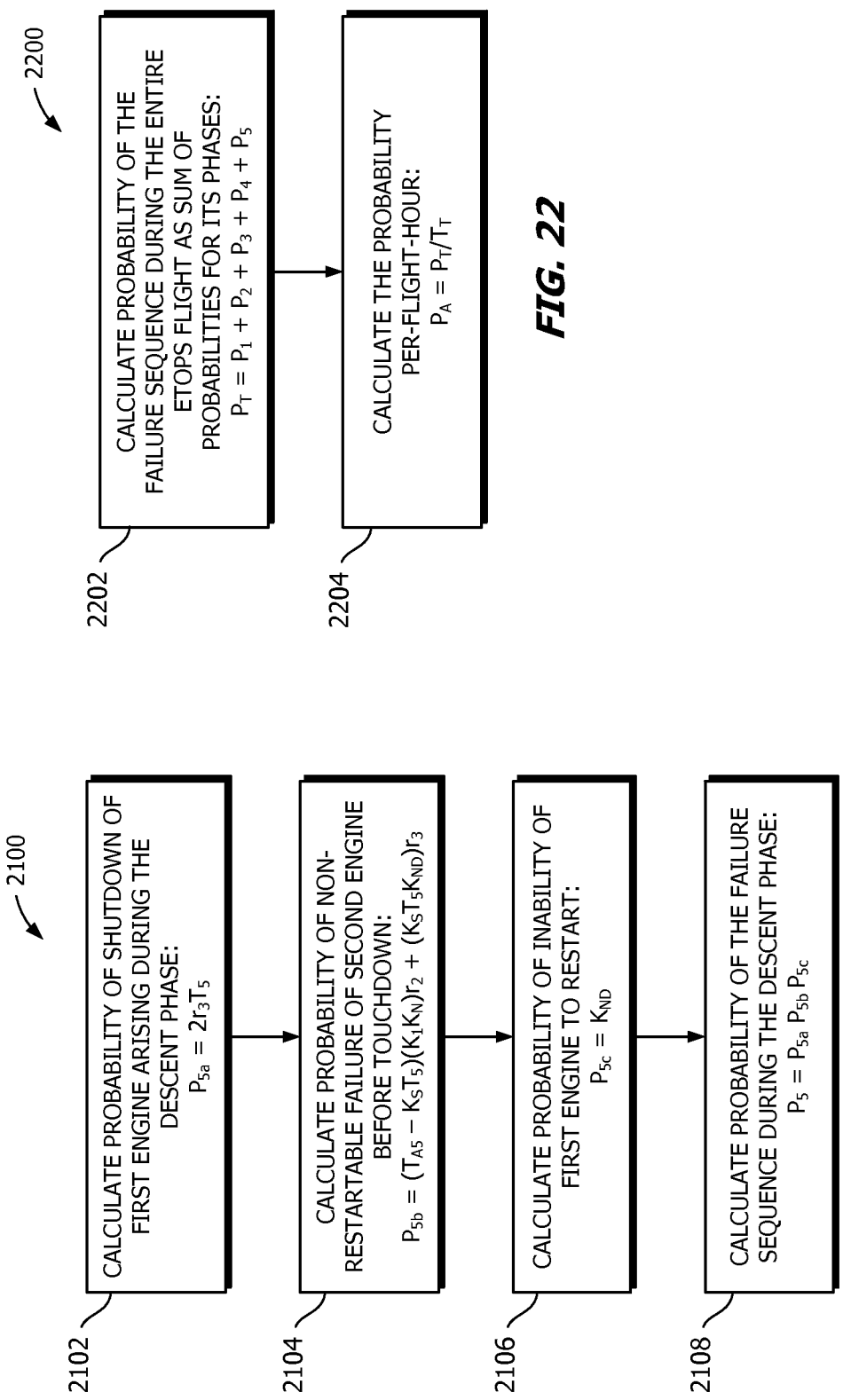

ESTABLISHING AVAILABILITY OF A TWO-ENGINE AIRCRAFT FOR AN ETOPS FLIGHT OR AN ETOPS FLIGHT PATH FOR A TWO-ENGINE AIRCRAFT

CROSS-REFERENCE TO RELATED APPLICATION(S)

The present application is a continuation of U.S. patent application Ser. No. 14/172,458, entitled: Establishing Availability of a Two-Engine Aircraft for an ETOPS Flight or an ETOPS Flight Path for a Two-Engine Aircraft, filed on Feb. 4, 2014, which is a continuation-in-part of U.S. patent application Ser. No. 12/877,951, entitled: ETOPS IFSD Risk Calculator, filed on Sep. 8, 2010, the contents of both of which are incorporated herein by reference in their entireties.

TECHNOLOGICAL FIELD

The present disclosure relates generally to establishing availability of a two-engine aircraft or flight path for the other; and, in particular, to establishing availability of a two-engine aircraft for an ETOPS flight, or an ETOPS flight path for a two-engine aircraft, based on an analysis of the risk of two independent engine failures during flight.

BACKGROUND

Aircraft range capabilities have increased over the decades, allowing flight operations to increasingly traverse remote areas where the aircraft (or airplane) is at times far from the nearest airport. The International Civil Aviation Organization (ICAO) Standards and Recommended Practices (SARPs) set rules for two-engine (twin-engine) commercial air travel. The rules permit twin-engine commercial air travel on flight paths (routes) that extend beyond a distance of 60 minutes of flying time at one-engine inoperative speed from a nearest airport if the aircraft and operator are approved for such operations. These operations are referred to as extended operations, or under the acronym ETOPS (Extended Operations).

First flown in 1985, ETOPS is a conservative, evolutionary program that enhances safety, reliability and efficiency during extended operations. An enormously successful part of many operators' daily operations, ETOPS benefits passengers and operators (airlines) alike. To passengers, it means greater choice in flights, greater convenience in departure and arrival times, and a higher likelihood that flights will be direct and on-time. To operators (airlines), ETOPS means greater profitability and flexibility, because it makes the superior efficiency and reliability of two-engine aircraft available on routes that were once the exclusive domain of three- and four-engine aircraft.

Although ETOPS stands for extended operations, it may be more accurately described by the alternative phrase "extended-diversion-time operations" (EDTO). ETOPS or EDTO flights are those conducted on routes that at some point take the aircraft far from an airport, and a long diversion may be required were the flight crew to elect to divert and fly to an alternate airport.

The ETOPS program uses a proven "preclude" and "protect" philosophy to mitigate associated risks. This dual philosophy seeks to "preclude" diversions through design and maintenance requirements that enhance the reliability and robustness of aircraft, and their engines and systems. Diversions can never be entirely eliminated, however, since most result from passenger illness, weather and other factors unrelated to the functioning of the aircraft and its systems. And because diversions can never be entirely eliminated, ETOPS seeks to "protect" those diversions that do occur through robust aircraft and system design as well as operational requirements such as airport planning, a fuel reserve, a passenger-recovery plan and so on.

Many ETOPS requirements are based on risk analysis or estimation. Among its more notable design requirements, ETOPS requires increased engine (propulsion) reliability to reduce engine-related risks. These risks are often characterized by the risk of losing thrust from either or both engines during flight of a two-engine aircraft, with the in-flight failure of an engine oftentimes being characterized as an in-flight shutdown (IFSD).

For a two-engine aircraft on an ETOPS flight, one risk of prominent concern is the loss of thrust from both engines (dual-engine failure or shutdown). The necessary failure scenario is a sequence that begins with a first engine shutdown (IFSD) during an ETOPS flight, followed by a non-restartable second engine IFSD before touchdown at the destination airport or an alternate airport, followed by an inability of the first engine to restart. This scenario may be referred to as a two (or dual) independent engine failure scenario, and its sequence may be referred to as a two (or dual) independent engine shutdown sequence.

ETOPS regulations generally require low IFSD rates, and these rates are underpinned by a number of different (loss of thrust) risk models (or equations) that have been developed. These risk models may only roughly approximate risk, and in particular, risk of dual independent engine shutdown. Most of the current models generally have similar shortfalls. The current models generally treat an ETOPS flight as a whole and try to average the risk over the whole flight. To do this, the current models make assumptions and generalizations, usually leaning toward conservative choices. A summed risk of the conservative choices may overwhelm an actual risk, and the summed risk may portray a risk that is substantially higher than an actual risk. Another problem with use of the current models is lack of versatility and visibility. There is substantially no way to adjust the current models based on varying operations or assumptions, or to examine how estimated risk builds as a flight progresses.

Therefore, it may be desirable to have a system and method that improves upon existing practices.

BRIEF SUMMARY

More two-engine aircraft and flight paths may be made available to aircraft operators when their estimated risk is lower. If risk can be more-accurately estimated and shown to be lower, more aircraft may be made available for operators to fly more direct flight paths and to more locations. If regulators learn the drivers of risk, they may be less likely to restrict aircraft or flight paths due to substantially inconsequential risks. Currently, many regulators around the world are unnecessarily restricting aircraft and flight paths based on non-optimal beliefs of risk drivers and risk levels of current operations. The focus of regulations and restrictions is often incorrectly placed on a risk of dual independent engine in-flight shutdowns on two-engine aircraft. Example implementations of the present disclosure are therefore generally directed to an improved model for establishing availability of a two-engine aircraft for a predefined ETOPS flight (e.g., having a predefined ETOPS flight path), or an ETOPS flight path for a predefined two-engine aircraft (e.g., a predefined model of two-engine aircraft). According to example implementations, availability of the aircraft or ETOPS flight path may be based on a calculated risk of a dual independent engine shutdown sequence during flight, and a preexisting baseline such as may be provided by appropriate ETOPS regulations.

Example implementations of the present disclosure may demonstrate more accurate and lower risk of a dual independent engine shutdown sequence. This may establish availability of and encourage and enable aircraft regulators to approve more aircraft for ETOPS flights, and allow flight paths with longer ETOPS rule times, which may in turn result in reduced fuel consumption, higher payload range and lower flight times for two-engine ETOPS operations. Example implementations may provide a fast method for regulators, operators, aircraft manufacturers and engine manufacturers to observe an actual effect of many flight parameters on this risk during ETOPS operations. When viewed relative to appropriate ETOPS regulations or other preexisting baseline, the lower risk demonstrated according to example implementations may establish availability of aircraft or flight paths for ETOPS flights. And this established availability may allow regulators to confidently approve more aircraft or flight paths for ETOPS operations around the world.

According to one aspect of example implementations, a method is provided for establishing availability of a two-engine aircraft for a predefined ETOPS flight. The method may include calculating a probability of a dual independent engine shutdown sequence for each of a climb phase, a plurality of cruise phases including an ETOPS phase, and a descent phase into which the predefined ETOPS flight is divisible. The dual independent engine shutdown sequence may be composed of a sequence of events that for each phase may be mutually exclusive of others of the phases. The sequence of events for a phase may include events having respective, conditional probabilities specific to a model of the two-engine aircraft, where a product of the conditional probabilities for a phase is the probability of the shutdown sequence for the respective phase. The method may include calculating a risk of the dual independent engine shutdown sequence during the predefined ETOPS flight as a function of a sum of the probabilities for the phases. The method may then include establishing availability of the two-engine aircraft for the predefined ETOPS flight based on the risk and a preexisting baseline.

According to another aspect of example implementations, a method is provided for establishing availability of an ETOPS flight path for a predefined two-engine aircraft. The method may include calculating the probability of a dual independent engine shutdown sequence for each phase into which the ETOPS flight is divisible, similar to before. Here, the conditional probability for the ETOPS phase may be specific to an ETOPS rule time for the ETOPS flight path. Similar to before, the method may include calculating the risk of the dual independent engine shutdown sequence. The method may then include establishing availability of the ETOPS flight path based on the risk and a preexisting baseline.

In some examples, the predefined ETOPS flight includes takeoff from an origin airport and touchdown at a destination airport. In these examples, the dual independent engine shutdown sequence may be composed of a sequence of events that for each phase includes in sequence, a first engine shutdown during the predefined ETOPS flight, a non-restartable second engine shutdown before touchdown at the destination airport or an alternate airport, and an inability of the first engine to restart.

In some examples, the method may further include calculating the conditional probability of the first event for each phase. In these examples, the conditional probability of the first event for a phase may be calculated as a function of a product of an engine shutdown rate for and a time duration of the respective phase.

In some further examples, the method may further include receiving input including at least the engine shutdown rate for each phase. In these further examples, the engine shutdown rate for a phase may be a function of a historical weighting of engine shutdown rates for the respective phase, with the historical weighting being specific to the model of the two-engine aircraft.

In some examples, the method may further include calculating the conditional probability of the second event for each phase. In these examples, the conditional probability of the second event may be calculated as a function of a projected time duration to touchdown at the destination airport or alternate airport.

In some examples, the method may further include calculating the conditional probability of the third event for each phase. In these examples, the conditional probability of the third event for a phase may be calculated as the ratio of a non-restartable engine shutdown rate to total engine shutdown rate for the respective phase.

In some further examples, the method may further include receiving input including at least the ratio of a non-restartable engine shutdown rate to total engine shutdown rate for each phase. In these further examples, the ratio of a non-restartable engine shutdown rate to total engine shutdown rate for each phase may be established by experience and specific to the model of the two-engine aircraft.

In other aspects of example implementations, systems and computer-readable storage mediums are provided for establishing availability of a two-engine aircraft for a predefined ETOPS flight, or an ETOPS flight path for a predefined two-engine aircraft. This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. The features, functions and advantages discussed herein may be achieved independently in various example implementations or may be combined in yet other example implementations further details of which may be seen with reference to the following description and drawings.

BRIEF DESCRIPTION OF THE DRAWING(S)

A more complete understanding of example implementations of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale. And wherein:

FIG. 10 is an illustration of an example input parameter table of an ETOPS IFSD risk calculator module, according to an example implementation;

FIG. 13 is an illustration of example graphical output of summed risks shown in the output parameter table of FIG. 12, presented on a display using a bar chart graph according to an example implementation;

FIG. 14 is an illustration of an example graphical output of the cumulative risk progression of all phases of an ETOPS flight shown in the output parameter table of FIG. 12, presented on a display using a linear graph according to an example implementation;

FIG. 15 is an illustration of an example input parameter table presented on a display, according to an example implementation; and FIGS. 16-22 are illustrations of example flow charts showing a process and sub-processes for analyzing a risk of extended operations (ETOPS) dual independent engine in-flight shutdown (IFSD), according to an example implementation.

DETAILED DESCRIPTION

Figure 1:
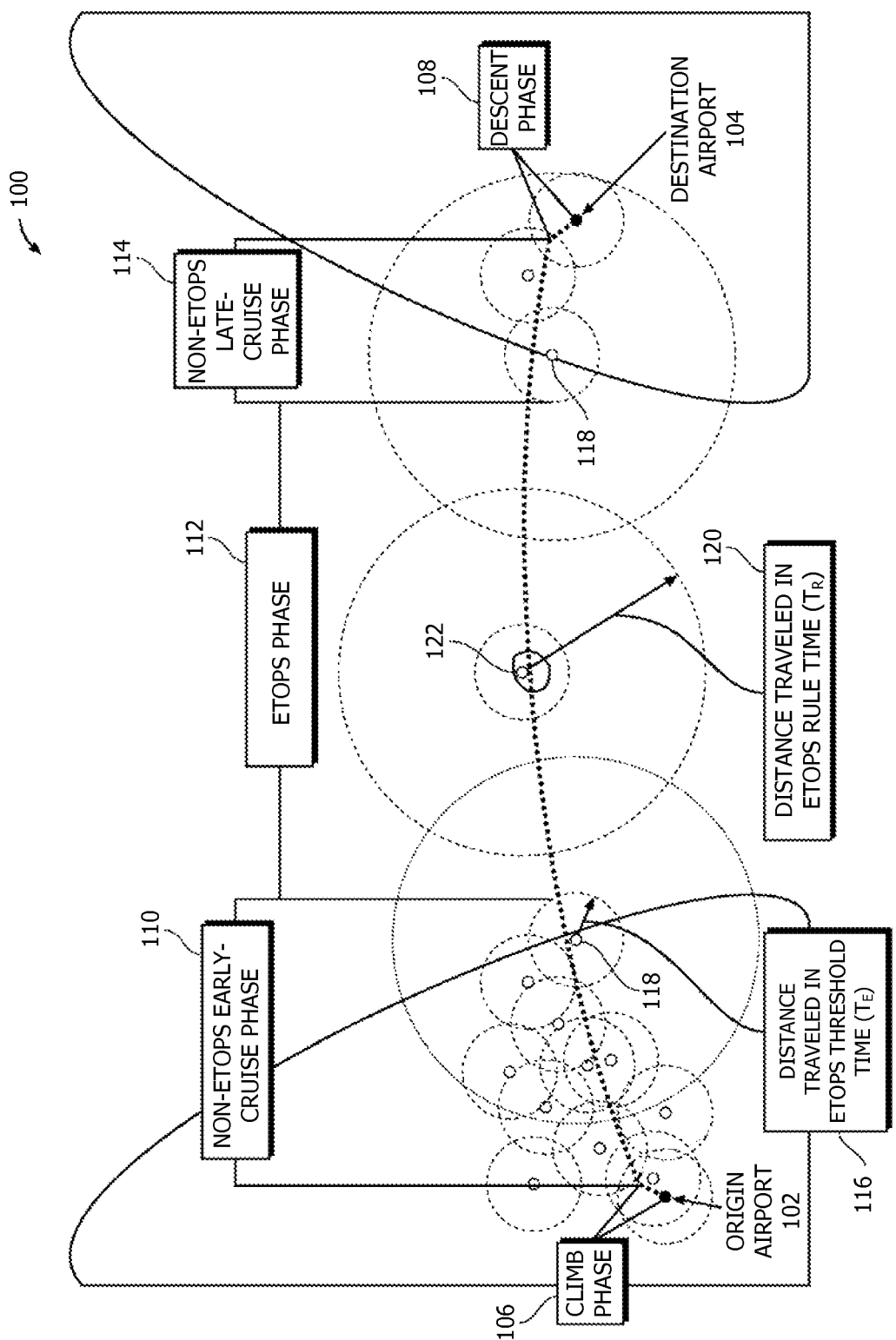
FIG. 1 is an illustration of phases of an ETOPS flight, in accordance with an example implementation.

The following detailed description is example in nature and is not intended to limit the disclosure or the application and uses of the implementations of the present disclosure. Descriptions of specific devices, technique and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Example implementations of the present disclosure may be described herein in terms of functional and/or logical block components and various processing steps. It should be appreciated that such block components may be realized by any number of hardware, software and/or firmware components configured to perform the specified functions. For the sake of brevity, conventional techniques and components related to aircraft operations, and other functional aspects of the systems (and the individual operating components of the systems), may not be described in detail herein. In addition, those skilled in the art will appreciate that example implementations of the present disclosure may be practiced in conjunction with a variety of two-engine aircraft types, and that the implementations described herein are merely example implementations of the present disclosure.

Example implementations of the present disclosure relate generally to establishing availability of a two-engine (twin-engine) aircraft or flight path; and, in particular, to establishing availability of a two-engine aircraft for a predefined ETOPS flight, or an ETOPS flight path for a predefined two-engine aircraft, based on an analysis of the risk of two independent engine failures or shutdowns (dual independent engine failure or shutdown) during flight. Example implementations are described herein in the context of a practical, non-limiting application, namely, twin-engine ETOPS aircraft operations.

In addition to aircraft or flight-path (route) analysis, example implementations of the present disclosure may be useful for other type of vehicles and applications that endure long distance operations using one or more propulsion units, systems and/or engines. Other type of vehicles and applications may include (comprise), for example but without limitation, various types of manned aircraft, unmanned aircraft, military missions, spacecraft and the like. Example implementations of the present disclosure may also be used for analyzing capabilities of legacy aircraft, and new, prospective and contemplative aircraft designs.

As may be apparent to one of ordinary skill in the art after reading this description, the following are examples and example implementations of the present disclosure and are not limited to operating in accordance with these examples. Other implementations may be utilized and changes may be made without departing from the scope of the example implementations of the present disclosure.

FIG. 1 is an illustration of various phases of an ETOPS flight 100. As shown, ETOPS flight may start with takeoff (or liftoff) from an origin airport 102 and end with touchdown at a destination airport 104, and may follow an STOPS flight path (ETOPS route) between the origin and destination airports. The phases of the ETOPS flight may include a climb phase 106, one or more cruise phases and a descent phase 108. As shown, the cruise phases may include a non-ETOPS early-cruise phase 110, an ETOPS phase 112 and a non-ETOPS late-cruise phase 114. And each of these phases may have a respective normal (average) time duration of two-engine flight, namely, $T_1$ (for climb), $T_2$ (for non-ETOPS early-cruise), $T_3$ (for ETOPS), $T_4$ (for non-ETOPS late-cruise) and $T_5$ (for descent), the sum of which may be the planned total flight time for the ETOPS flight ($T_T = T_1 + T_2 + T_3 + T_4 + T_5$).

The climb phase 106 may refer to the portion of an ETOPS flight 100 from takeoff until start of the first of the cruise phase(s) (e.g., non-ETOPS early-cruise phase 110). The descent phase 108 may refer to the portion of the ETOPS flight from the end of the last cruise phase(s) (e.g., non-ETOPS late-cruise phase 114) until touchdown (landing) at the destination airport 104. During the climb phase in particular, the aircraft engines may operate at a high power level in order to increase the aircraft's altitude to a cruise level, and they may have a higher shutdown rate than during the relatively lower power level of normal cruise operation. Engine shutdown rates during the climb phase may also be higher than those during the cruise phase(s) for other reasons, such as a non-optimal maintenance state during initial operation after engine maintenance, additional engine stress due to operation in variable atmospheric conditions at varying altitudes, and the like.

The non-ETOPS early-cruise phase 110 may refer to the portion of the ETOPS flight 100 from the end of the climb phase 106 until the first point the aircraft is more than an ETOPS threshold time ($T_E$) 116 from the nearest (suitable) airport 118, at one-engine inoperative cruise speed. Related to $T_E$, an ETOPS rule time ($T_R$) 120 may refer to a maximum time allowed at any point during the flight for the aircraft to fly to a suitable airport at one-engine inoperative cruise speed.

The non-ETOPS early-cruise phase 110 may include one or more climbs and/or descents. In some examples, the ETOPS threshold time ($T_E$) 116 may be set at one hour (60 minutes) from the nearest airport 118. In other examples, an ETOPS flight may have a non-existent non-ETOPS early-cruise phase (zero time duration), such as when the ETOPS flight is still in climb 106 when the ETOPS flight reaches $T_E$ from the nearest airport at one-engine inoperative cruise speed. Notably, the nearest airport at this point may still be the origin airport 102.

The ETOPS phase 112 may refer to the portion of the ETOPS flight 100 from the first point (moment) to the last point that the aircraft is more than $T_E$ 116 from the nearest (suitable) airport 118 at one-engine inoperative cruise speed. Similar to the non-ETOPS early-cruise phase 110, the ETOPS phase may include one or more climbs and/or descents. In some examples, the ETOPS phase may pass directly over (the aircraft may fly directly over) a suitable alternate airport 122, provided that there are portions of the flight both before and after that are greater than $T_E$ from the nearest airport.

The non-ETOPS late-cruise phase 114 may refer to the portion of the ETOPS flight 100 from the last point at which the aircraft is more than $T_E$ 116 from the nearest airport 118 at one-engine inoperative cruise speed, until the start of the descent phase 108. Similar to the non-ETOPS early-cruise phase, non-ETOPS late-cruise phase may include one or more climbs and/or descents, or the ETOPS flight may have a non-existent non-ETOPS late-cruise phase (zero time duration). In some examples, a non-existent non-ETOPS late-cruise phase may occur when the aircraft starts its descent to land while more than $T_E$ from the nearest airport (alternate 118 or destination 104) at one-engine inoperative cruise speed.

Example implementations of the present disclosure provide an ETOPS IFSD risk calculator configured to calculate the risk of a "dual independent engine shutdown sequence" for various two-engine aircraft (e.g., models of two-engine aircraft) or ETOPS flight paths (routes) comprising the five phases of the ETOPS flight. The ETOPS IFSD risk calculator may be used to provide evidence of satisfactory performance in single-engine-out conditions as may be needed for performance certification by various civil aviation authorities that apply appropriate regulations, which may thereby establish availability of an aircraft for the ETOPS flight, or ETOPS flight path for the aircraft. In various examples, these civil aviation authorities may include without limitation: the United States Federal Aviation Administration (FAA), European Aviation Safety Agency (EASA), Joint Aviation Authorities (JAA), European Civil Aviation Conference (ECAC), European Organisation for the Safety of Air Navigation (Eurocontrol), Japan Civil Aviation Bureau (JCAB), General Administration of Civil Aviation of China (CAAC), International Civil Aviation Organization (ICAO) and the like.

Figure 2:
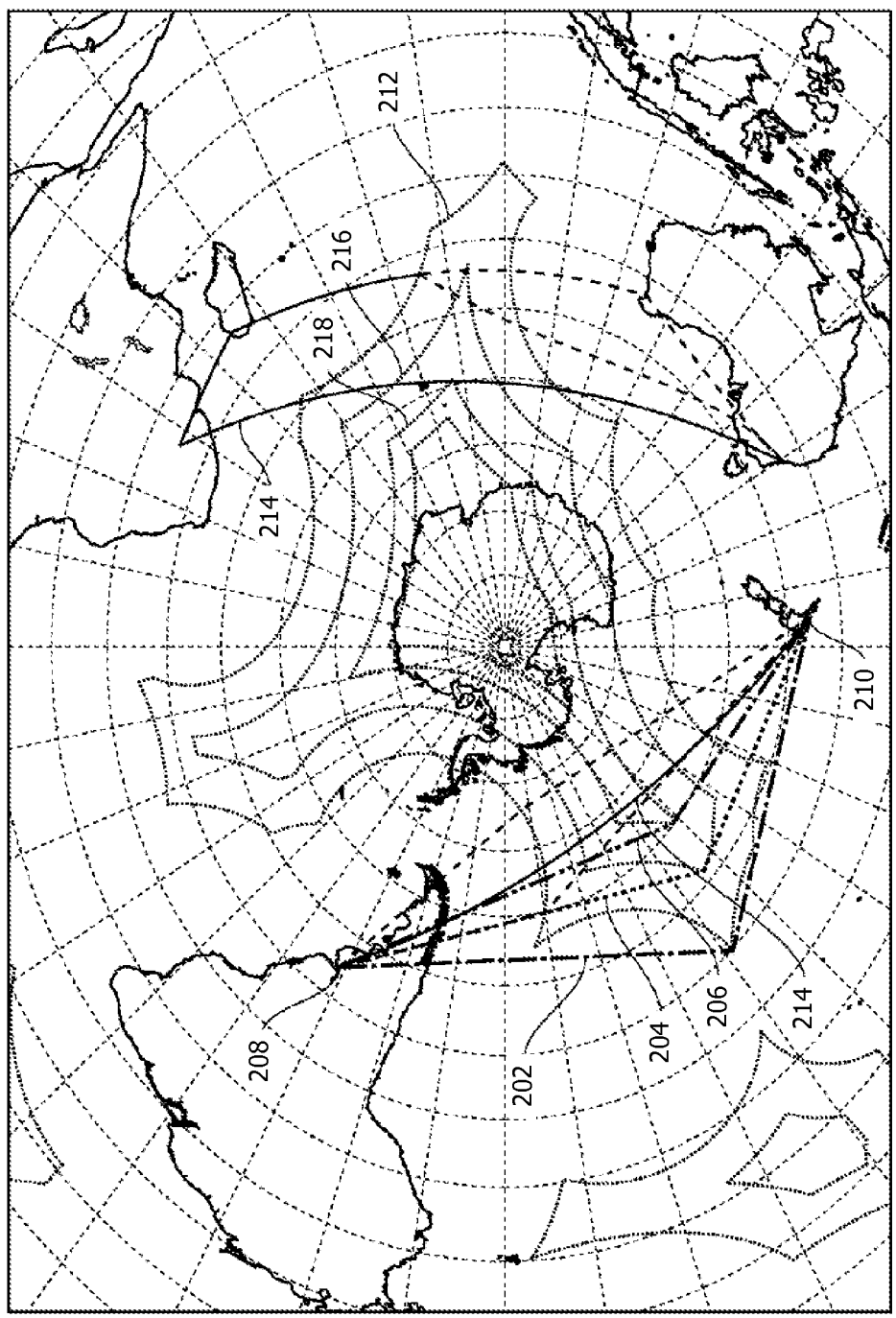
FIG. 2 is an illustration of an ETOPS flight between Buenos Aires and Auckland with three different ETOPS flight paths having respective ETOPS rule times, in accordance with an example implementation.
Figure 3:
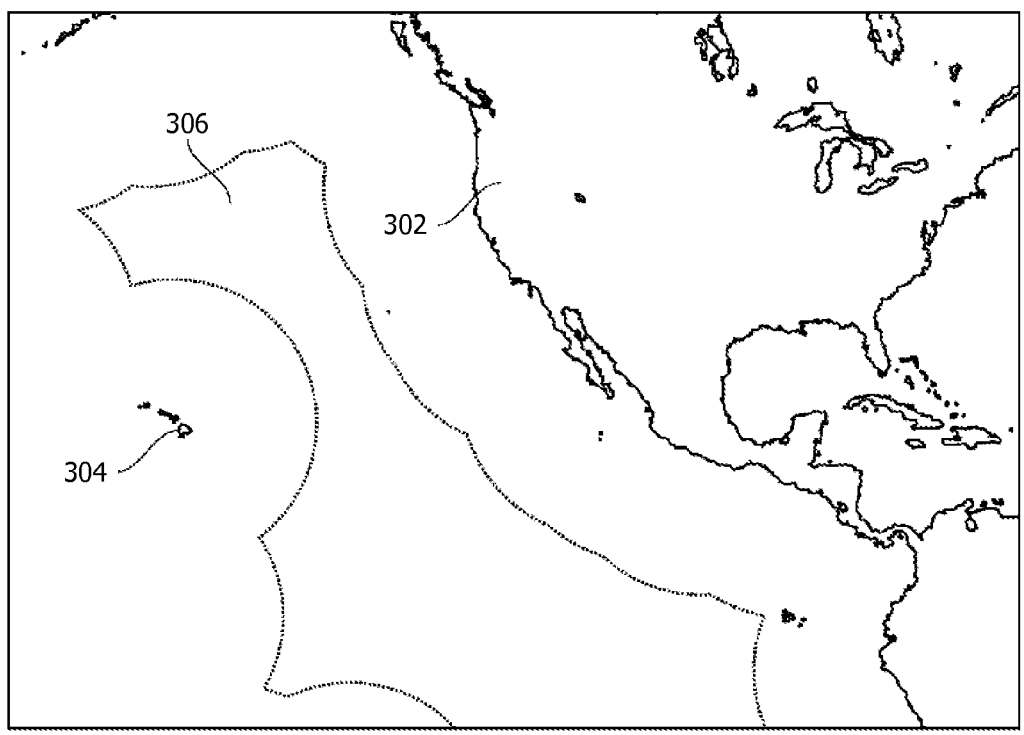
FIG. 3 is an illustration of a map showing that flights between the contiguous United States and Hawaii may not be practical using 120-minute ETOPS rules, in accordance with an example implementation.

ETOPS flights in the year 2010 were restricted to 180-minutes, as measured by the ETOPS rule time ($T_R$) 120. However, longer ETOPS times such as 240-minutes and 300-minutes afforded by lower risk may equate to shorter flights. FIG. 2 is an illustration of three ETOPS flight paths with respective ETOPS approval levels, and FIG. 3 shows that longer ETOPS times also make some flight paths (routes) available. Aviation regulators may be more likely to grant more and longer ETOPS approvals when the risk of dual independent engine shutdown is shown to be within tolerable limits according to example implementations of the present disclosure.

FIG. 2 is an illustration of a map of a long-range operation in the southern hemisphere of the Earth showing three ETOPS flight paths 202, 204 and 206 with varying, respective ETOPS approval levels between Buenos Aires 208 and Auckland 210. The flight paths are based on three different, respective ETOPS rule times ($T_R$) 120. The flight path 202 uses the current, popular 180-minute 212 ETOPS rule, and is required to fly a long path far from an optimal great circle 214. However, longer ETOPS times of 240-minutes 216 and 300-minutes 218, afforded by lower risk equate to shorter flights such as the fight path 204 and the flight path 206, respectively. The flight path 204 may be shorter, using the 240-minute ETOPS rule; and the flight path 206 may be nearly optimal, using the 300-minute ETOPS rule. By demonstrating sufficiently low risk, when viewed relative to an appropriate preexisting baseline such as that provided by appropriate ETOPS regulations, example implementations of the present disclosure may establish availability of an aircraft for an ETOPS flight, or an ETOPS flight path for an aircraft. This may enable regulators to allow operators to use more aircraft and flight paths with longer ETOPS rule times, which may mean shorter flights that equate to lower fuel consumption, lower pollution, and higher payload range.

FIG. 3 shows that flights between the contiguous United States 302 and Hawaii 304 are not practical using 120-minute ETOPS rules. An area 306 may represent the region that is further than 120-minutes from the nearest airport, and thus out-of-bounds for a 120-minute ETOPS flight. However, with the 180-minute ETOPS, the area may no longer be applicative, and flights from Hawaii may be allowed direct paths to and from the contiguous United States. Thus, longer ETOPS times may also make some ETOPS flight paths (routes) possible. And again, aviation regulators may be more likely to grant more and longer ETOPS flight approvals when the risk of dual independent engine shutdown is shown to be within tolerable limits according to example implementations of the present disclosure.

According to example implementations of the present disclosure, the ETOPS IFSD risk calculator may be configured to calculate the risk of a dual independent engine shutdown sequence. A dual independent engine shutdown sequence may include in sequence, a first event of a first engine shutdown during a predefined ETOPS flight 100, a second event of a non-restartable second engine shutdown before touchdown at the destination airport 104 or an alternate airport, and a third event of an inability of the first engine to restart. For each phase of the flight, then, the ETOPS IFSD risk calculator may calculate (or determine) a probability that a first engine shutdown will be followed by a second engine shutdown (unrestartable or non-restartable) before the aircraft can land, and an inability of the first engine to restart (the first engine shutdown will not be restartable, or otherwise being unable to restart). This may include, for example, the probability of a total thrust loss from two (dual) independent engine shutdowns starting during the climb phase 106 ($P_1$), during the non-ETOPS early-cruise phase 110 ($P_2$), during the ETOPS phase 112 ($P_3$), during the non-ETOPS late-cruise phase 114 ($P_4$), and during the descent phase 108 ($P_5$). A "total thrust loss" may refer to permanent (non-restartable) loss of thrust from both engines, and "starting" may refer to the first engine shutdown arising.

The ETOPS IFSD risk calculator may be configured to calculate the risk of a dual independent engine shutdown sequence for each of the five phases of flight, and may do so based on an event-sequence analysis probabilistic model. Because an event sequence in each phase is mutually exclusive of the other phases of the five phases of flight, the ETOPS IFSD risk calculator may sum the risks to obtain the risk for the total flight. That is, the ETOPS IFSD risk calculator may sum the probabilities in the five phases of flight to obtain a probability of the event sequence happening in a whole of the ETOPS flight. This may include, for example, the probability of total thrust loss from two independent engine shutdowns starting at any time during the entire ETOPS flight ($P_T$). And in some examples, $P_T$ may be a per-flight probability of a complete and permanent (non-restartable) loss of aircraft thrust, which may be calculated as follows:

$$P_T = P_1 + P_2 + P_3 + P_4 + P_5 \quad (1)$$

The risk calculated by the ETOPS IFSD risk calculator may be more accurate and demonstratively lower than a conventional risk estimate that conventional analysis and conventional risk models (equations) generally indicate, and lower than other known risks. When viewed relative to an appropriate preexisting baseline (e.g., ETOPS regulations) this lower risk may establish availability of an aircraft for an ETOPS flight, or an ETOPS flight path for an aircraft. This established availability may in turn justify to regulators more aircraft or ETOPS flight paths with longer ETOPS rule times, which may result in shorter flights, reduced fuel consumption, and higher payload range for two-engine ETOPS operations.

In accordance with the event-sequence analysis probabilistic model of example implementations, the events of a dual independent engine shutdown sequence for a phase may have respective, conditional probabilities, and the product of these probabilities may be the probability of the sequence for the respective phase. These probabilities may be conditional upon assuming that events (if any) arose previously and in the time sequence. FIGS. 4, 5, 6, 7 and 8 illustrate example event trees that show events of the event sequence and their respective, conditional probabilities for the climb phase 106, non-ETOPS early-cruise phase 110, ETOPS phase 112, non-ETOPS late-cruise phase 114 and descent phase 108, respectively.

Figure 4:
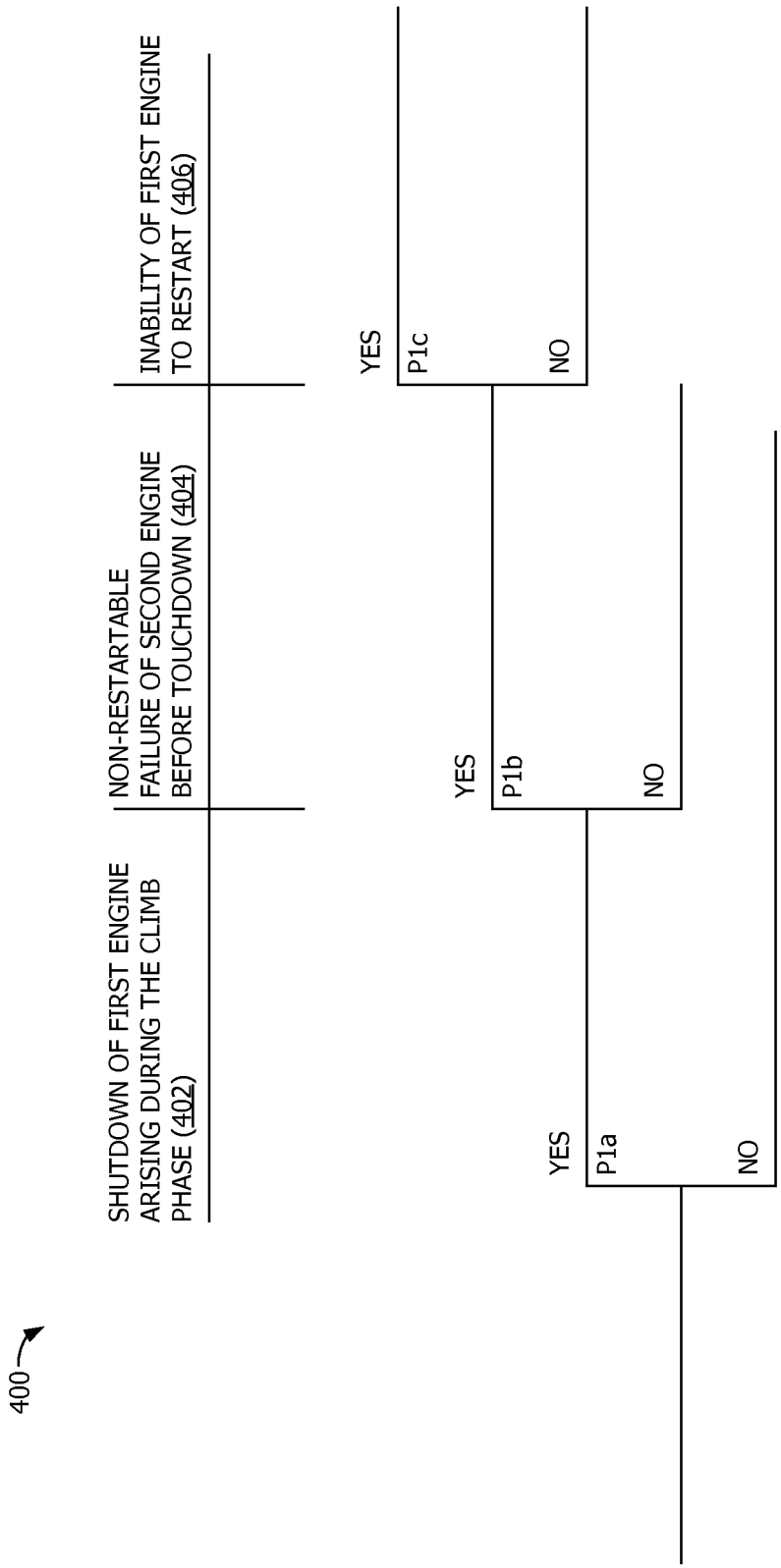
FIGS. 4, 5, 6, 7 and 8 illustrate example event trees that show events of a dual independent engine shutdown sequence and their respective, conditional probabilities for phases of an ETOPS flight, according to example implementations.

FIG. 4 illustrates an example event tree 400 for a dual independent engine shutdown sequence during the climb phase 106. As shown, a first engine operational anomaly may arise and the engine shutdown (a first event 402) with the probability:

$$P_{1a} = 2r_1 T_1 \quad (2)$$

This probability of an initial IFSD may be based on the assumption of two engines operating during takeoff and climb, and the per-engine shutdown rate during the climb phase ($r_1$) (engine shutdowns per engine climb hour), and normal (average) duration of the climb phase ($T_1$).

The climb phase engine shutdown rate ($r_1$) (climb IFSD rate $r_1$) (per-engine shutdown rate during the climb phase 106) may represent shutdowns per engine climb hour. It may be calculated based on an average total-flight IFSD rate per engine flight hour ($K_F$). In this regard, $K_F$ may approximate the IFSD rate averaged over the ETOPS flight as a whole (1,000×engine shutdowns/engine flight hours over entire ETOPS flights). Through 2008, a particular aircraft type experienced an average rate (both ETOPS flights and all flights) ($K_F$) of 0.0004, and example implementations may default to this value. In other examples, a user may enter any desired value for this IFSD rate ($K_F$), and the shutdown rate ($r_1$) and perhaps other shutdown rates and risks that depend on $K_F$ in the climb phase and other phases may adjust proportionately.

In some more particular examples, the climb IFSD rate ($r_1$) may be calculated based on the average total-flight IFSD rate per engine flight hour ($K_F$) times a constant (7.4) that represents a historical weighting of the climb IFSD rate as compared to $K_F$ to obtain an un-scaled $r_1$. This un-scaled $r_1$ may then be divided by 1,000 to yield a familiar IFSD rate (per 1,000 engine flight hours) and maintain consistency in the product.

One particular typical aircraft type recorded 62 engine shutdowns in the 1,527,062 aircraft flights and 15,398,774 engine flight hours in the three years from 1 Jul. 2005 through 30 Jun. 2008. For these data, an average (total) IFSD rate may be calculated as $K_F = 62(1,000)/15,398,774 = 0.00403$ IFSDs per 1,000 engine flight hours. Half of the shutdowns (i.e., 31/62) either existed at or arose after liftoff and before the end of climb. Several events began in climb, but the engine did not shutdown until a later phase of flight (i.e., cruise, or descent to land back at the origin airport 102), with all shutdowns being counted in a phase of the separate phases in which the engine actually shutdown. For the average climb phase duration ($T_1$) of 20 minutes (⅓ hour), and accounting for two engines per aircraft, Climb IFSD rate ($r_1$)=31(1,000)/[(1,527,062)(2)(0.333)]=0.030 IFSDs per 1,000 engine climb hours.

In some examples, a constant ratio of climb IFSD rate ($r_1$) to total IFSD rate ($K_F$) may be used to increase the average total IFSD rate by the historical proportion to derive the climb phase IFSD rate ($r_1$). For example:

Climb IFSD rate ($r_1$)/total IFSD rate ($K_F$)=constant (e.g., 0.030/0.00403=7.4).

This constant ratio (divided by 1,000 to accommodate a familiar IFSD rate format) may be multiplied by the total IFSD rate ($K_F$) to derive the climb IFSD rate used in the specific calculation.

Returning to the climb phase dual independent engine shutdown sequence, after the first engine shutdown (first event 402), the remaining engine may experience a non-restartable shutdown while the aircraft flies with one-engine out to dump fuel and land (a second event 404). The probability of this second event occurring may be expressed as follows:

$$P_{1b} = (T_{A1} K_S T_5)(K_1 K_N) r_2 + (K_S T_5 K_{ND}) r_3 \quad (3)$$

The probability ($P_{1b}$) may be that of a second IFSD after a first engine shutdown occurred in the climb phase 106. The probability may be based on the first IFSD in the climb portion being followed by single-engine cruise while dumping fuel to avoid an overweight landing (a cruise portion), and $K_S T_5$ hours to descend and touch down at an airport (the time from top of descent at the lower single-engine altitude to landing) (a descent portion). In the probability ($P_{1b}$), then, a shutdown rate for the cruise portion may be represented by ($T_{A1} - K_S T_5$)($K_1 K_N$)$r_2$; and a shutdown rate for the descent portion may be represented by ($K_S T_5 K_{ND}$)$r_3$.

In the cruise portion, single-engine cruise time may be ($T_{A1} - K_S T_5$), and the single-engine cruise IFSD rate may be ($K_1 K_N$)$r_2$. The variable $T_{A1}$ may represent the projected time to land following an engine shutdown while in the climb phase 106. Service experience shows that climb shutdowns tend to happen earlier in climb (i.e., more than half of climb IFSDs happen prior to half way through the climb phase 106). If the probabilistic model assumes the average climb IFSD happens half way through climb, then the flight may be $T_1/2 = 0.333/2 = 0.167$ hours from the origin airport 102. However, there is another factor that lengthens a time to land.

Early in the flight, the aircraft is heavy with fuel. To land that heavy may be non-optimal for the landing gear, and may require a costly, time-consuming inspection. To land light, the crew may (and usually does) elect to spend time dumping fuel into the atmosphere prior to landing. Considering fuel dump time, a conservative estimate of an average of $T_{A1}$ may be 42 minutes (or 0.7 hours). Example implementations may use this value by default, but allow the user to choose a projected $T_{A1}$ between lower and upper limits. The lower limit (minimum limit) on $T_{A1}$ may represent a minimum time to land an aircraft in the climb phase 106 when an engine shutdown, and may be about 0.1 hours (e.g., while at low altitude and close to an airport). The upper limit (maximum limit) on $T_{A1}$ may consider fuel dump time, and may be about 1 hour (i.e., barring other factors).

The variable $T_5$ may represent the normal time duration of two-engine descent phase time, and may be constant for all flights (e.g., at 0.417 hours). That is, $T_5$ may represent the time from top of descent at normal two-engine cruise to landing.

The variable $K_S$ may represent a ratio of single-engine descent time to two-engine descent time. $K_S$ may be a little lower in the early portion of flight because single engine cruise altitude is lower with a weight comprising most of the fuel remaining onboard. However, a reasonable default average may be 0.6. That is, 60% of the time may be required to descend and land from a single-engine cruise altitude as from a two-engine cruise altitude.

The variable $K_1$ may be a single-engine-cruise shutdown-stress factor that accounts for the increased stress on the single remaining operating engine. $K_1$ may be the ratio of the per-engine engine-shutdown time-rate during single-engine low-altitude cruise with high thrust level to the per-engine engine-shutdown time-rate during two-engine high-altitude cruise with normal cruise thrust level. In some examples, a value of 2 may be used by default, meaning that the stresses of single engine flight will double the probability of shutdown on the engine still running. According to engine manufacturers, $K_1$ is actually very close to one, not two, which is corroborated by a lack of any such event in history. Therefore, using this high value is a substantially strong measure of conservatism. In some examples, the user may choose to adjust this ratio.

The variable $K_N$ may be a ratio of hard cruise IFSD rate to total cruise IFSD rate, and the variable $K_{ND}$ may be a ratio of hard descent IFSD rate to total descent IFSD rate. Based on in-service experience in the 3 years ending June 2008, a default value of $K_N$ may be set to 0.78, meaning 78% of cruise IFSDs are hard and 22% restartable (i.e., 5/23 are not hard). Similarly based on in-service experience in the 3 years ending June 2008, a default value of $K_{ND}$ may be 1.0, meaning all 8 of the descent IFSDs are hard and none restartable.

The factor ($K_N$) may eliminate unnecessary IFSDs from second IFSDs in cruise, and it may have the effect of lowering the IFSD rate of the one remaining engine after an IFSD. But the default value of $K_1$ in the calculation may double the normal cruise IFSD rate for this second IFSD, which may make the calculation very conservative.

A hard IFSD may be considered one that cannot be safely restarted and operated up to maximum continuous thrust for an extended period of time. The hard IFSD may be identical to a non-restartable IFSD. Some IFSDs (i.e., those that are not-hard IFSDs) may be due to false indications or misperceptions—the engines are actually fully capable of continuing running (e.g., a false indication of a clogged oil filter, or a false indication of a fire). Hard or non-restartable engine shutdowns may sometimes be restarted (e.g., some have even provided critical thrust in an emergency) but to do so may be considered non-optimal operation, may provide less than maximum thrust, and/or may cause engine operational anomalies. For the sake of conservatism, example implementations may not calculate the possibility of restarting hard IFSDs, and may instead assume that all hard IFSDs (non-restartable engines) will not run again for the duration of the flight.

In the cruise portion of equation (3), $r_2$ may be the cruise phase engine shutdown rate (cruise IFSD rate $r_2$) (per-engine shutdown rate during the cruise phase $r_2$) representing shutdowns per engine high-altitude-cruise hour, as explained more fully below. And in the descent portion of equation (3), $r_3$ may be the descent phase engine shutdown rate (descent IFSD rate $r_3$), as explained more fully below for the first IFSD in descent 108.

For the climb phase 106, then, example implementations may use its per-engine shutdown rate ($r_1$) (climb IFSD rate) for the first IFSD. After this, the crew may not shut down the one remaining engine or allow the one remaining engine to stop producing thrust unless it's unavoidable. Therefore, the ensuing cruise (with time to dump fuel to reduce landing weight) and the descent IFSD rate of the second engine may be reduced by a ratio of hard cruise IFSD rate to total cruise IFSD rate ($K_N$), and a ratio of hard descent IFSD rate to total descent IFSD rate ($K_{ND}$), respectively. But if the second engine shuts down after all attempts to keep the second engine running, the crew may attempt to restart the first engine that shutdown in climb.

After the second event 404, the climb phase dual independent engine shutdown sequence may further include an event (a third event 406) of the first engine shutdown being unable to restart, which may occur with the probability:

$$P_{1c} = K_{NI} \quad (4)$$

In the probability for this third event in the sequence, $K_{NI}$ may be the probability that the first engine, which shutdown in climb, will be unable to restart. It may also represent the ratio of hard climb IFSD rate to total climb IFSD rate ($K_M$). Based on in-service experience in the 3 years ending June 2008, $K_{NI}$ may have a default value of 0.87, meaning 87% of climb IFSDs are hard and 13% restartable (i.e., 4/31 are not hard).

The probability of the total thrust loss from dual independent engine shutdowns starting during the climb phase 106 ($P_1$) may be the product of the three conditional probabilities of the events of the sequence: 1) a first engine operational anomaly arises during the climb phase and the engine is shut down ($P_{1a}$); 2) the remaining engine shuts down while the airplane flies with one-engine out for $T_{A1}$ hours to dump fuel and land ($P_{1b}$); and 3) an inability of the first engine to restart ($P_{1c}$). Notationally, the probability ($P_1$) may be represented as follows:

$$P_1 = P_{1a} P_{1b} P_{1c} \quad (5)$$
$$= 2r_1 T_1 [(T_{A1} - K_S T_5)(K_1 K_N) r_2 + (K_S T_5 K_{ND}) r_3] K_{NI}$$

Figure 5:
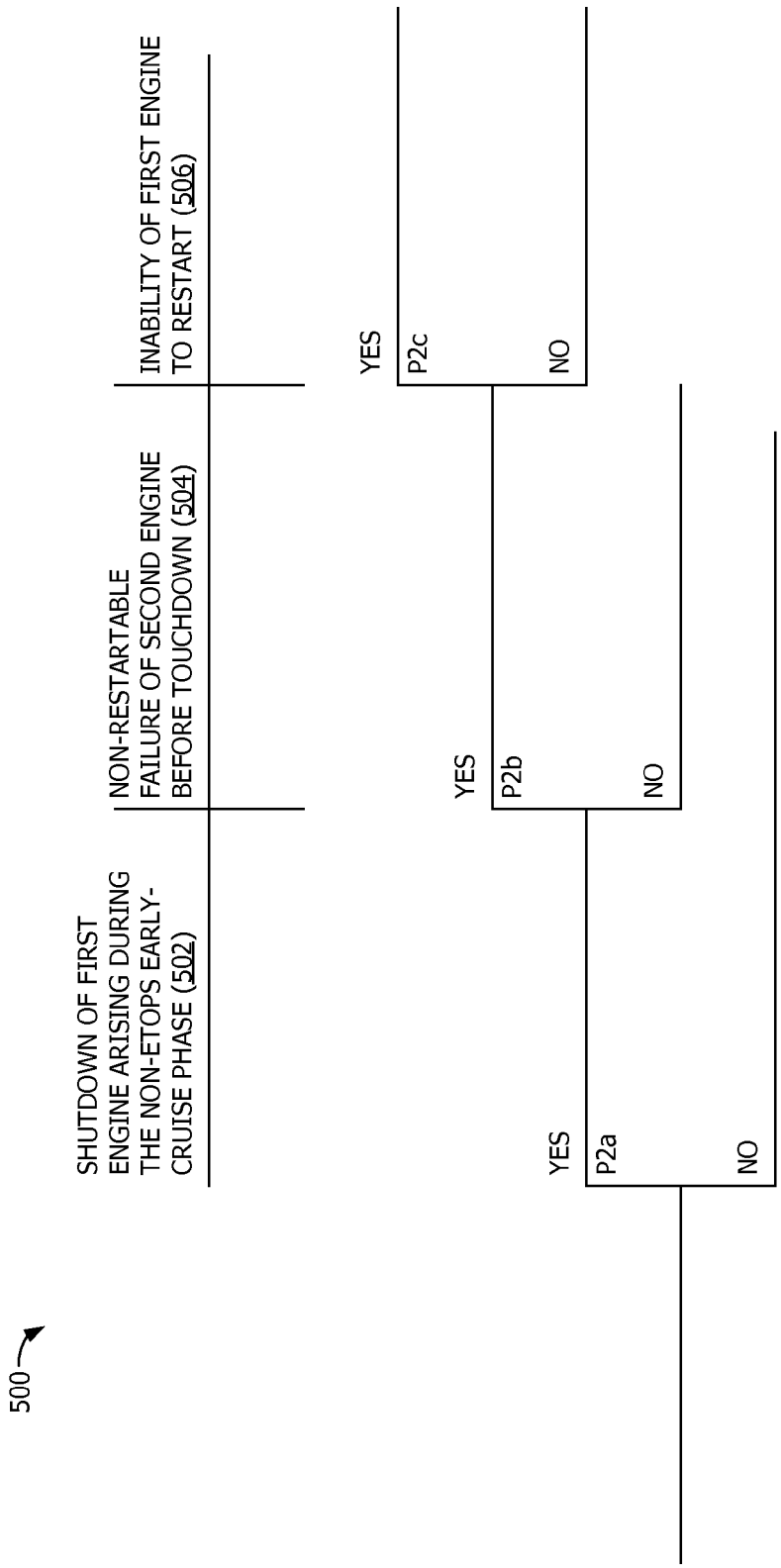

FIG. 5 illustrates an example event tree 500 for a dual independent engine shutdown sequence during the non-ETOPS early-cruise phase 110. As shown, a first engine operational anomaly may arise and the engine shutdown (a first event 502) with the probability:

$$P_{2a} = 2r_2 T_2 \quad (6)$$

This probability of an initial IFSD may be based on the assumption of two engines operating during high-altitude cruise, and the per-engine shutdown rate during high-altitude cruise ($r_2$) (engine shutdowns per engine high-altitude-cruise hour), and normal (average) duration of the non-ETOPS early-cruise phase ($T_2$).

Many real-world ETOPS flight paths (routes) have values of $T_2$ greater than 2 hours, some over 8 hours. Smaller values may equate to more flight time further from airports, so $T_2$ may be a way to depict a worst-case scenario in this regard. In some examples, $T_2$ may be user-selectable between a minimum limit and a maximum limit, which may be based on $T_1$ and the ETOPS threshold time ($T_E$) 116. The minimum limit of $T_2$ may be calculated as $T_E T_1$, but may be as low as zero if (in the unlikely event) the flight is still in the (initial) climb phase 106 when the it enters the ETOPS phase 112. The maximum limit of $T_2$ may be $T_T - 2T_E$. In one example, $T_T - T_E - T_1$ may be used as true upper limit of $T_2$. In practice, however, example implementations may use $T_T - 2T_E$ as a more conservative upper limit of $T_2$.

Introduced above, the cruise engine shutdown rate (r2) (cruise IFSD rate $r_2$) (per-engine shutdown rate during any of the cruise phases 110, 112, 114) may represent shutdowns per engine cruise hour. It may be calculated as the total IFSD rate ($K_F$) (either the default value or a value set by the user) times a constant (0.44) that represents a historical weighting of the cruise IFSD rate as compared to $K_F$ to obtain an un-scaled $r_2$. This un-scaled $r_2$ may then be divided by 1,000 to yield a familiar IFSD rate (per 1,000 engine flight hours) and maintain consistency in the product.

One particular typical aircraft type recorded 23 shutdowns between the top of the climb phase 106 and the start of the descent phase 108 during the 1,527,062 flights in the three years from 1 Jul. 2005 through 30 Jun. 2008. This aircraft type averaged a total flight time of 5.04 hours per flight (7,699,387 aircraft flight hours/1,527,062 aircraft flights). For the average climb phase duration ($T_1$) of 0.333 hours, and an average value of the normal time duration of two-engine descent phase ($T_5$) of 0.417 hours, and accounting for two engines per aircraft, an average value of the cruise IFSD rate ($r_2$) may be calculated as follows:

Cruise IFSD rate ($r_2$)=23/[(1,527,062)(2)(5.04–0.333–0.417)]=1.76(10$^{-6}$)=0.00176 IFSDs per 1,000 engine cruise hours.

As shown above, the total IFSD rate $K_F$ for the ETOPS flight may be 0.00403 IFSDs per 1,000 engine flight hours for a typical aircraft type. In some examples, a constant ratio of the cruise IFSD rate ($r_2$) to the total IFSD rate ($K_F$) may be used to decrease the total IFSD rate ($K_F$) by the historical proportion to derive the cruise IFSD rate ($r_2$). For example:

Cruise IFSD rate/total IFSD rate=constant (e.g., 0.00176/0.00403=0.44)

This constant ratio (divided by 1,000 to accommodate the familiar IFSD rate format) may be multiplied by the total IFSD rate ($K_F$) to derive the cruise IFSD rate used in the specific calculation.

The phases of cruise 110, 112, 114 may be the most benign (least dynamic) of the flight phases for the engine, and may also be the longest duration of the flight phases. The benign nature and long duration of the phases of cruise may combine to lower the cruise IFSD rate ($r_2$) as compared to the total IFSD rate ($K_F$). In recent years, as ETOPS maintenance practices have improved, there has been proportionately less maintenance caused IFSDs that tend to show up earlier in flight usually in climb. Therefore, the climb IFSD rate ($r_1$) may be improving, while the cruise IFSD rate ($r_2$) may be moving closer to the total IFSD rate ($K_F$). However, the latest cruise rates are still about half (0.44) of the total rate.

Returning to the non-ETOPS early-cruise phase dual independent engine shutdown sequence, after the first engine shutdown (first event 502), aircraft heads for the nearest airport and the remaining engine shuts down before landing (a second event 504). The probability of this second event occurring may be expressed as follows:

$$P_{2b}=(T_{A2}-K_S T_5)(K_1 K_N)r^2+(K_S T_5 K_{ND})r_3 \quad (7)$$

This may be the probability of a second IFSD after a first engine shutdown occurred in the non-ETOPS early-cruise phase 110, and it may be based on a previous engine shutdown being followed immediately by the flight heading towards the nearest suitable airport.

In equation (7), $T_{A2}$ may represent a projected single-engine time to land while in the non-ETOPS early-cruise phase 110 (the time spent flying to and landing at the nearest airport). This projected time ($T_{A2}$) may be calculated as follows: $T_{A2}=0.7(T_E-K_S T_5)+K_S T_5$, where (as explained above) $T_E$ represents the ETOPS threshold time ($T_E$) 116. In other terms, then, $P_{2b}$ may be expressed as:

$$P_{2b}=(0.7(T_E-K_S T_5))(K_1 K_N)r_2+(K_S T_5 K_{ND})r_3 \quad (7a)$$

The projected single-engine time to land while in the non-ETOPS early-cruise phase 110 ($T_{A2}$) may account for a drift-down from two-engine cruise altitude, cruise at single-engine altitude while dumping fuel, and descent to an airport. Similar to before, the descent time from single-engine cruise altitude may be reduced from the normal time duration of two-engine descent phase ($T_5$) by the factor $K_S$ (i.e., $K_S T_5$). If fuel dump time were not included, the average time may be closer to $K_S T_5$ than to $T_E$ 116. There will often be airports within the range of descent ($K_S T_5$), so $T_E$ may be a maximum rarely reached. Inclusion of fuel dump time may drive the average (expected) time to land higher, closer to $T_E$.

In some examples, then, $T_{A2}$ may have a minimum limit of $T_5$ (i.e., descent time from two-engine cruise altitude), and a maximum limit of $T_E$ 116. The maximum limit of $T_E$ (including fuel dump time) is described as follows. The engine-out cruise speed may be slower than all-engine cruise speed, but it may not be accounted for here for three reasons. First, by definition, the flight may be within $T_E$ of an airport (usually one hour), at engine-out speed. Second, there may be no cruise time simply to get to an airport in this scenario. After an IFSD, engine-out drift-down may begin, which may be nearly all-engine flight speed. The flight may enter the (actual) descent phase 108 at some lower than normal altitude (single-engine cruise altitude) without losing appreciable speed. And third, fuel dump time may be a far bigger factor, and drive the average time up from $T_5$ closer to $T_E$.

The factor of 0.7 in $T_{A2}$ may add a measure of conservativeness by increasing the exposure time above the average time indicated merely by the geometry of the location of the flight (which may be less than $0.5(T_E-K_S T_5)+K_S T_5$). That is, the factor of 0.7 may represent a conservative acknowledgement that a fuel-dump time or other situation may increase the single-engine flight time above a statistical average of 0.5 hours. So in $T_{A2}$, the single-engine cruise time may be 0.7 ($T_E-K_S T_5$), and the time remaining for descent to land may be $K_S T_5$.

The probability ($P_{2b}$) may be additionally based on an engine shutdown rate per engine low-altitude-cruise hour which is increased by a factor of $K_1$ over the per-engine shutdown rate during the climb phase ($r_2$) (engine shutdowns per engine high-altitude-cruise hour), and decreased by a factor of $K_N$ over the first shutdown (no unnecessary IFSDs on second IFSD). And further, $P_{2b}$ may be based on a per-engine descent shutdown rate $r_3$, reduced by $K_N$ over the shortened descent time $K_S T_5$.

Similar to the climb phase 106, then, for the non-ETOPS early-cruise phase 110, example implementations may use the total cruise IFSD rate ($r_2$) (including both hard and not hard IFSDs) for the first IFSD. When cruising and eventually descending on a single engine after the initial IFSD, the crew may not shut down the one remaining engine or allow the one remaining engine to stop producing thrust unless it's unavoidable. A per-engine shutdown rate of the second engine during the cruise phase ($r_2$) (cruise IFSD rate) and during the descent phase ($r_3$) (descent IFSD rate) may therefore be reduced by $K_N$ and $K_{ND}$, respectively. But if the second engine shuts down after all attempts to keep the second engine running, the crew may attempt to restart the first engine that shutdown in cruise.

In practice, the single-engine flight to landing may include fuel-dump time during a slow descent (drift-down) to the top of descent (at a low altitude) to the nearest airport, and then completion of descent from that lower altitude to landing. The preceding two-segment discrete model may be considered to fairly represent engine shutdown stresses during the trip.

Similar to before, after the second event 504, the sequence may further include an event (a third event 506) of the first engine shutdown being unable to restart, which in the non-ETOPS early-cruise phase 110 (and perhaps the other cruise phases 112, 114) may occur with the probability:

$$P_{2c} = K_N \quad (8)$$

Here, $K_N$ may be the probability that the first engine shutdown will not be restartable.

The probability of the total thrust loss from dual independent engine shutdowns starting during the non-ETOPS early-cruise phase 110 ($P_2$) may be the product of the three conditional probabilities of the events of the sequence: 1) a first engine operational anomaly arises during the non-ETOPS early-cruise phase and the engine is shut down ($P_{2a}$); 2) the aircraft heads for the nearest airport and the remaining engine is shut down before touchdown ($P_{2b}$); and 3) an inability of the first engine to restart ($P_{2c}$). Notationally, the probability ($P_2$) may be represented as follows:

$$P_2 = P_{2a} P_{2b} P_{2c} \quad (9)$$
$$= 2r_2 T_2 [(T_{A2} - K_S T_5)(K_1 K_N) r_2 + (K_S T_5 K_{ND}) r_3] K_N$$

Or in other terms, using equation (7a) instead of equation (7), the probability ($P_2$) may be represented as:

$$P_2 = 2r_2 T_2 [(0.7(T_E - K_S T_5))(K_1 K_N) r_2 + (K_S T_5 K_{ND}) r_3] K_N \quad (9a)$$

Figure 6:
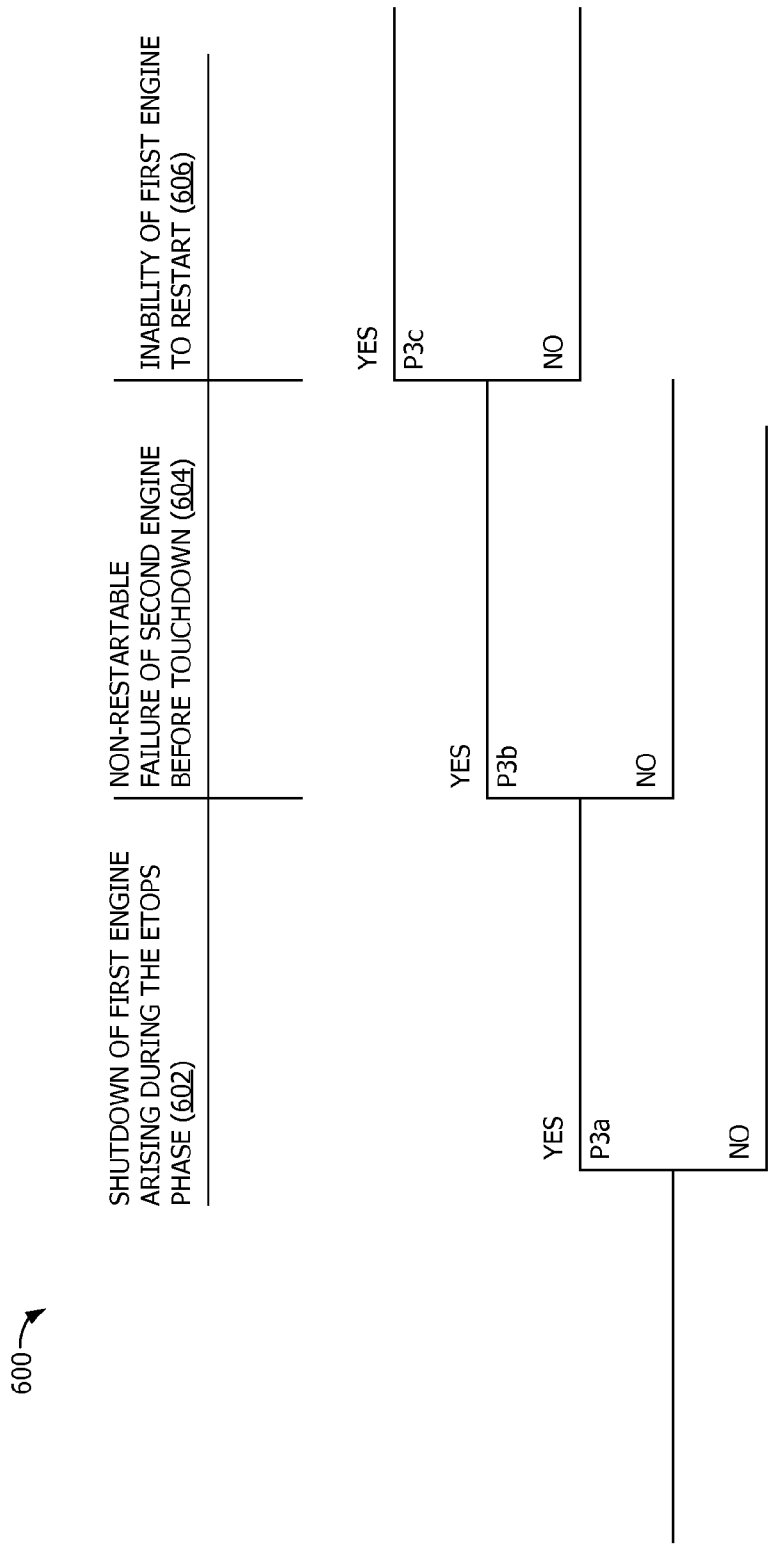

FIG. 6 illustrates an example event tree 600 for a dual independent engine shutdown sequence during the ETOPS phase 112. As shown, a first engine operational anomaly may arise and the engine shutdown (a first event 602) with the probability:

$$P_{3a} = 2r_2 T_3 \quad (10)$$

This probability of an initial IFSD may be based on the assumption of two engines operating during high-altitude cruise, and the engine shutdowns per engine high-altitude-cruise hour/per-engine shutdown rate during the cruise phase ($r_2$), and normal time duration of the ETOPS phase ($T_3$).

In some examples, the normal time duration of the ETOPS phase ($T_3$) may be calculated as the difference between the total flight time (set by user) and the sum of all other phases, such as in the following manner: $T_3 = T_T - (T_1 + T_2 + T_4 + T_5)$. In some examples, $T_3$ may be between a minimum (lower) limit and a maximum (upper) limit. The minimum limit on $T_3$ may be zero for a non-ETOPS flight, or greater than zero for an ETOPS flight. The maximum limit on $T_3$ may be $T_T - 2T_E$. This may represent a theoretical flight with the longest possible ETOPS phase 112 in which the first and last hours may be the only portions where an airport is within an hour of flight at single-engine speed. There may be very few if any flight paths (routes) where $T_3$ approaches this maximum, which may require the shortest possible lengths of both $T_2$ and $T_4$. Thus, by giving short values to $T_2$ and $T_4$, a user may select a worst-case scenario in this regard selecting the longest possible ETOPS phase (portion of flight), given the planned total flight time ($T_T$) and ETOPS threshold ($T_E$).

After the first event 602, the flight heads towards the nearest suitable airport and the remaining engine shuts down before landing (a second event 604), with the following probability:

$$P_{3b} = (T_{A3} - K_S T_5)(K_1 K_N) r_2 + (K_S T_5 K_{ND}) r_3 \quad (11)$$

This probability may be that of a second IFSD after a first engine shutdown occurred in the ETOPS phase 112. And it may be based on a previous engine shutdown in the ETOPS phase being followed immediately by the flight heading towards the nearest suitable airport.

In equation (11), $T_{A3}$ may represent the projected single-engine time to land while in the ETOPS phase 112, and it may be calculated as follows: $T_{A3} = \min(T_E + T_3/4, T_E + 0.6(T_R - T_E))$. That is, $T_{A3}$ may be calculated as the lesser of: $[T_E + T_3/4]$ or $[T_E + 0.6(T_R - T_E)]$. Again, $T_E$ represents the ETOPS threshold time ($T_E$) 116, and $T_R$ represents an ETOPS rule time ($T_R$) 120. In other terms, then, $P_{3b}$ may be expressed as:

$$P_{3b} = \min[(T_E + T_3/4 - K_S T_5)(K_1 K_N) r_2, (T_E + 0.6(T_R - T_E) - K_S T_5)(K_1 K_N) r_2] + (K_S T_5 K_{ND}) r_3 \quad (11a)$$

In the ETOPS phase 112, the projected single-engine time to land ($T_{A3}$) may be explained in more detail below in connection with two specific airports. The airport whose ETOPS threshold border marks the beginning of the ETOPS phase may be referred to as $A_B$, and it may be the origin airport 102 or an ETOPS alternate airport 118. The airport whose ETOPS threshold border marks the end of the ETOPS phase may be referred to as $A_E$, and it may be the destination airport 104 or an ETOPS alternate airport such as alternate airport 118.

ETOPS flights with short ETOPS phases 112 where the $T_R$ 120 borders of $A_B$ and $A_E$ intersect may not need any other ETOPS alternate airports 118 within the ETOPS portion of flight. In calculating the projected time to land ($T_{A3}$) in this portion of flight, it may be assume that no other airports are available. Thus, when a diversion is necessary, the flight must either return to $A_B$ or proceed to $A_E$. This may be a measure of conservatism because other airports (e.g., alternate airport 122) may be available to provide a closer (sooner) opportunity to land. When $T_3$ is zero (non-ETOPS flight), $T_{A3} \leq T_E$ (and far less than $T_R$). As the ETOPS portion of flight (duration of $T_3$) expands from zero to $2(T_R - T_E)$, which is where the $T_R$ borders of $A_B$ and $A_E$ are tangent, the upper limit of $T_{A3}$ may remain at $T_E$ $T_3/2$ and grow linearly from $T_E$ to $T_R$. During this time, the worst case average $T_{A3}$ (assuming diversions must either return to $A_B$ or proceed to $A_E$) may remain at $T_E$ $T_3/4$.

As the duration of $T_3$ expands beyond $2(T_R - T_E)$, other ETOPS alternate airports 118 may become necessary. For $T_3$ durations beyond $2(T_R - T_E)$, the upper limit may remain at $T_R$, but the average $T_{A3}$ may remain below $T_E + (T_R - T_E)/2$. That is, the flight may on average be closer to an airport than halfway between $T_E$ and $T_R$. The fact that portions of the ETOPS phase 112 may be directly over an alternate airport 122 may skew the average time to land shorter than many flight paths (routes) may seem to indicate. However, for conservativeness, example implementations of the present disclosure may use the average $T_{A3}$ for $T_3$ over $2(T_R-T_E)$ to be $T_E+0.6(T_R-T_E)$. This may be analogous to flights that stay far from airports as they travel between equal time points that are at or near $T_R$ 120.

Because the above $T_E T_3/4$ expression for the short ETOPS phases 112 assumes no alternate airports other than $A_B$ and $A_E$, it may no longer be applicable for longer ETOPS phases, and erroneously generate long diversion times. Similarly, the above $T_E+(T_R-T_E)/2$ expression may not be applicable for short ETOPS phases and erroneously generate long diversion times there. Example implementations of the present disclosure may therefore evaluate the output of both equations and select the smallest $T_{A3}$, which may automatically select the appropriate average diversion time $(T_{A3})$ for $T_3$.

The time $(T_{A3})$ may therefore be the lesser of $[T_E+T_3/4]$ or $[T_E+0.6(T_R-T_E)]$ to reach the nearest airport (depending on the size of the ETOPS phase 112). In some examples, $T_{A3}$ may have a minimum limit of $T_5$. This may be a rare occurrence, but nonetheless, a true minimum. Despite the fact that this is the ETOPS phase, the flight may indeed be within descent time of an alternate airport (with diversion times beyond $T_E$ 116 both before and after that point in the original flight plan). On the high side, it may be possible for $T_{A3}$ to be slightly longer than $T_R$ because regulations do not include slowing to land in the distances calculated from $T_R$ 120 for the operator's ETOPS flight plan. However, the extreme remoteness of this possibility along with its very small value and conservativeness elsewhere in these calculations may in some examples remove it from consideration.

To calculate and sum risks in the probability $(P_{3b})$, the flight to landing may be broken into two phases, namely, single-engine drift-down and cruise, and descent to landing. The descent to landing time from single-engine altitude (the time from top of descent at the lower single-engine altitude to landing) may be $K_S$ times the descent to landing from normal cruise altitude $(T_5)$ (the time from top of descent at normal two-engine cruise to landing) (i.e., $K_S T_5$). This time may be removed from the above times to landing and counted separately as descent, which has different risks. That is, the single-engine cruise time may be the lesser of the two times above, but each reduced by the descent time $K_S T_5$. Or written notationally, the flight to landing may be the lesser of $[T_E+(T_3)/4-K_S T_5]$ or $[T_E+0.6(T_R-T_E)-K_S T_5]$.

The probability $(P_{3b})$ may be additionally based on a per-engine shutdown rate per engine low-altitude cruise hour which is increased by the stress factor of $K_1$ over the high-altitude two-engine cruise rate $(r_2)$, and decreased by a factor of $K_N$ over the first shutdown (no unnecessary IFSDs on second IFSD) for the cruise portion. And further, $P_{3b}$ may be based on a per-engine descent shutdown rate $(r_3)$ over a descent time of $K_S T_5$, decreased by a factor of $K_{NE}$ over the first shutdown (no unnecessary IFSDs on second IFSD) for the descent portion.

Again, after the second event 604, the sequence may further include an event (a third event 606) of the first engine shutdown being unable to restart, which in the ETOPS phase 112 (similar to the non-ETOPS early-cruise phase 110) may occur with the probability:

$$P_{3c}=K_N \qquad (12)$$

Again, $K_N$ may be the probability that the first engine shutdown will not be restartable.

The probability of the total thrust loss from dual independent engine shutdowns starting during the ETOPS phase 112 $(P_3)$ may be the product of the three conditional probabilities of the events of the sequence: 1) a first engine operational anomaly arises during the ETOPS phase and the engine is shut down $(P_{3a})$; 2) the aircraft heads towards the nearest suitable airport and the remaining engine shuts down before touchdown $(P_{3b})$; and 3) an inability of the first engine to restart $(P_{3c})$. Notationally, the probability $(P_3)$ may be represented as follows:

$$P_3 = P_{3a} P_{3b} P_{3c} \qquad (13)$$
$$= 2r_2 T_3 [(T_{A3} - K_S T_5)(K_1 K_N)r_2 + (K_S T_5 K_{ND})r_3]K_N$$

Or by substitution with the aforementioned expression of $T_{A3}$, the probability may be represented as:

$$P_3 = 2r_2 T_3 [\min[(T_E+T_3/4-K_S T_5)(K_1 K_N)r_2, (T_E+0.6(T_R-T_E)-K_S T_5)(K_1 K_N)r_2]+(K_S T_5 K_{ND})r_3]K_N \qquad (13a)$$

Figure 7:
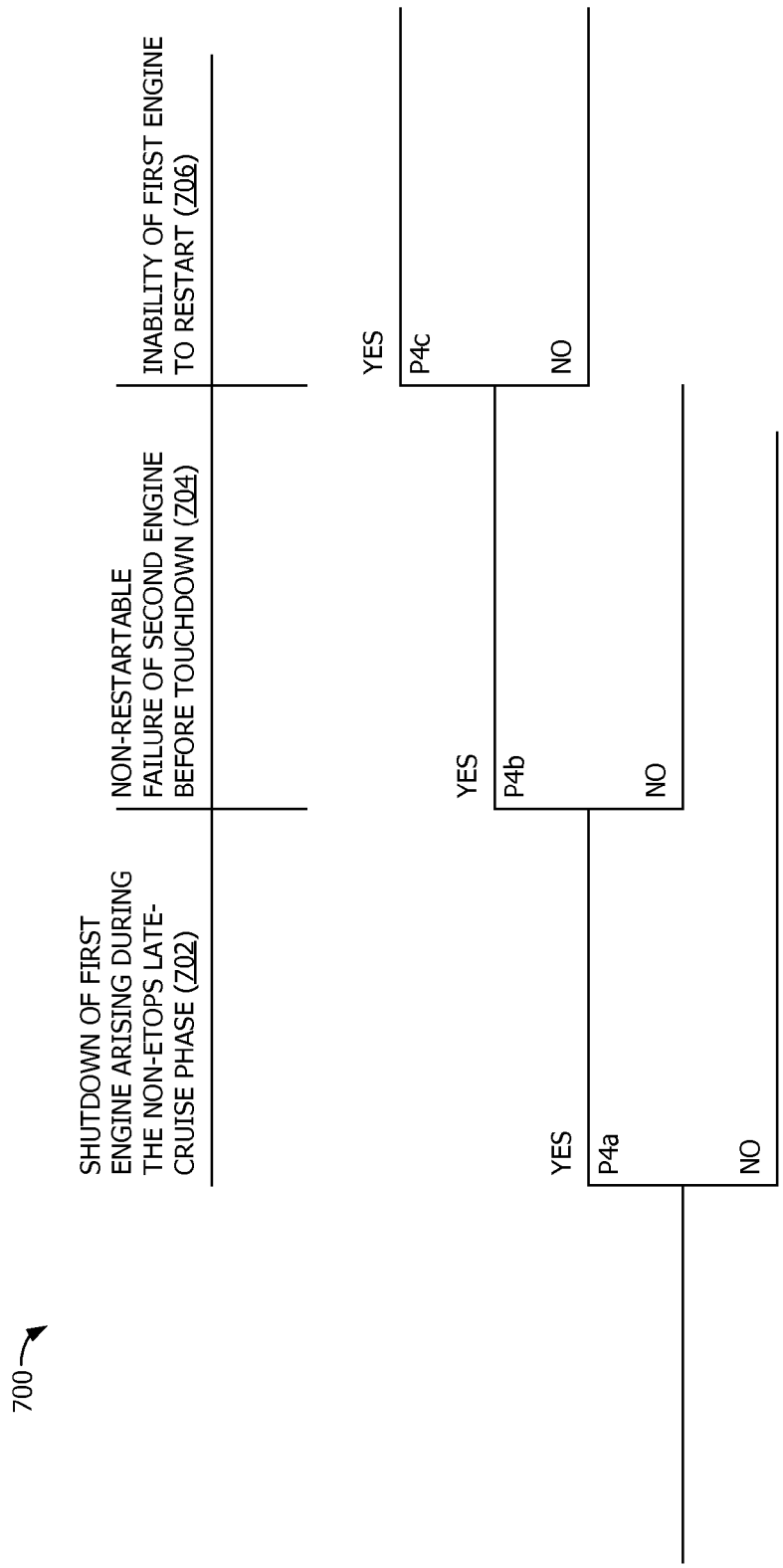

FIG. 7 illustrates an example event tree 790 for a dual independent engine shutdown sequence during the non-ETOPS late-cruise phase 114. As shown, a first engine operational anomaly may arise and the engine shutdown (a first event 702) with the probability:

$$P_{4a}=2r_2 T_4 \qquad (14)$$

This probability of an initial IFSD may be based on the per-engine shutdown rate during high-altitude cruise $(r_2)$, and normal time duration of the non-ETOPS late-cruise phase $(T_4)$.

In the non-ETOPS late-cruise phase 114, the normal time duration $(T_4)$ may be that portion of the flight that starts the last moment the closest airport $(A_E)$ is more than the ETOPS threshold time $(T_E)$ 116 away (usually one hour) as the flight then may cruise past alternate airports, and ends at the start of descent to land. In some examples, $T_4$ may be between a minimum limit and a maximum limit. The minimum limit of $T_4$ may be calculated as $T_E-T_5$, while maximum limit on $T_4$ may be calculated as $T_T-2T_E$. In some examples, $T_4$ may be as low as zero if (in the unlikely event) the flight starts descending to land while still in the ETOPS phase 112, although this may generally not occur in instances in which a normal descent time $(T_5)$ of 0.417 hours is used.

After the first event 702, the aircraft flies toward the nearest airport but the remaining engine shuts down before landing (a second event 704), with the following probability:

$$P_{4b}(T_{A4}-K_S T_5)(K_1 K_N)r_2+(K_S T_5 K_{ND})r_3 \qquad (15)$$

This probability may be that of a second IFSD after a first engine shutdown occurred in the non-ETOPS late-cruise phase 114.

In equation (15), $T_{A4}$ may represent the projected single-engine time to land while in the non-ETOPS late-cruise phase 114, and it may be calculated as $(T_E+T_5)/2$. In other terms, then, $P_{4b}$ may be expressed as:

$$P_{4b}=(T_E+T_5)/2-K_S T_5)(K_1 K_N)r_2+(K_S T_5 K_{ND})r_3 \qquad (15a)$$

In the non-ETOPS late-cruise phase 114, the projected single-engine time to land $(T_{A4})$ may have a minimum limit of $T_5$ (i.e., airport can be reached in normal descent time), and an upper (or maximum) limit of $T_E$ (i.e., the nearest airport is ETOPS threshold time $T_E$ 116 away). There may often be airports within the range of two-engine descent time $(T_5)$, but $T_E$ may be a maximum rarely experienced. Therefore, an average time to land may be closer to the two-engine descent time ($T_5$) than to $T_E$. But for conservativeness, example implementations may calculate a projected time to land as the average of $T_5$ and $T_E$.

After the second event 704, the sequence may further include an event (a third event 706) of the first engine shutdown being unable to restart, which in the non-ETOPS late-cruise phase 114 (similar to the non-ETOPS early-cruise phase 110 and ETOPS phase 112) may occur with the probability:

$$P_{4c} = K_N \tag{16}$$

Once again, $K_N$ may be the probability that the first engine shutdown will not be restartable.

The probability of the total thrust loss from dual independent engine shutdowns starting during the non-ETOPS late-cruise phase 114 ($P_4$) may be the product of the three conditional probabilities of the events of the sequence: 1) a first operational anomaly arises during the non-ETOPS late-cruise phase and the engine is shut down ($P_{4a}$); 2) the aircraft flies toward the nearest airport but the remaining engine fails before touchdown ($P_{4b}$); and 3) an inability of the first engine to restart ($P_{4c}$). Notationally, the probability ($P_4$) may be represented as follows:

$$P_4 = P_{4a} P_{4b} P_{4c} \tag{17}$$
$$= 2r_2 T_4 [(T_{A4} - K_S T_5)(K_1 K_N) r_2 + (K_S T_5 K_{ND}) r_3] K_N$$

Or by substitution with the aforementioned expression of $T_{A4}$, the probability may be represented as:

$$P_4 = 2r_2 T_4 [(T_E + T_5)/2 - K_S T_5)(K_1 K_N) r_2 + (K_S T_5 K_{ND}) r_3] K_N \tag{17a}$$

Figure 8:
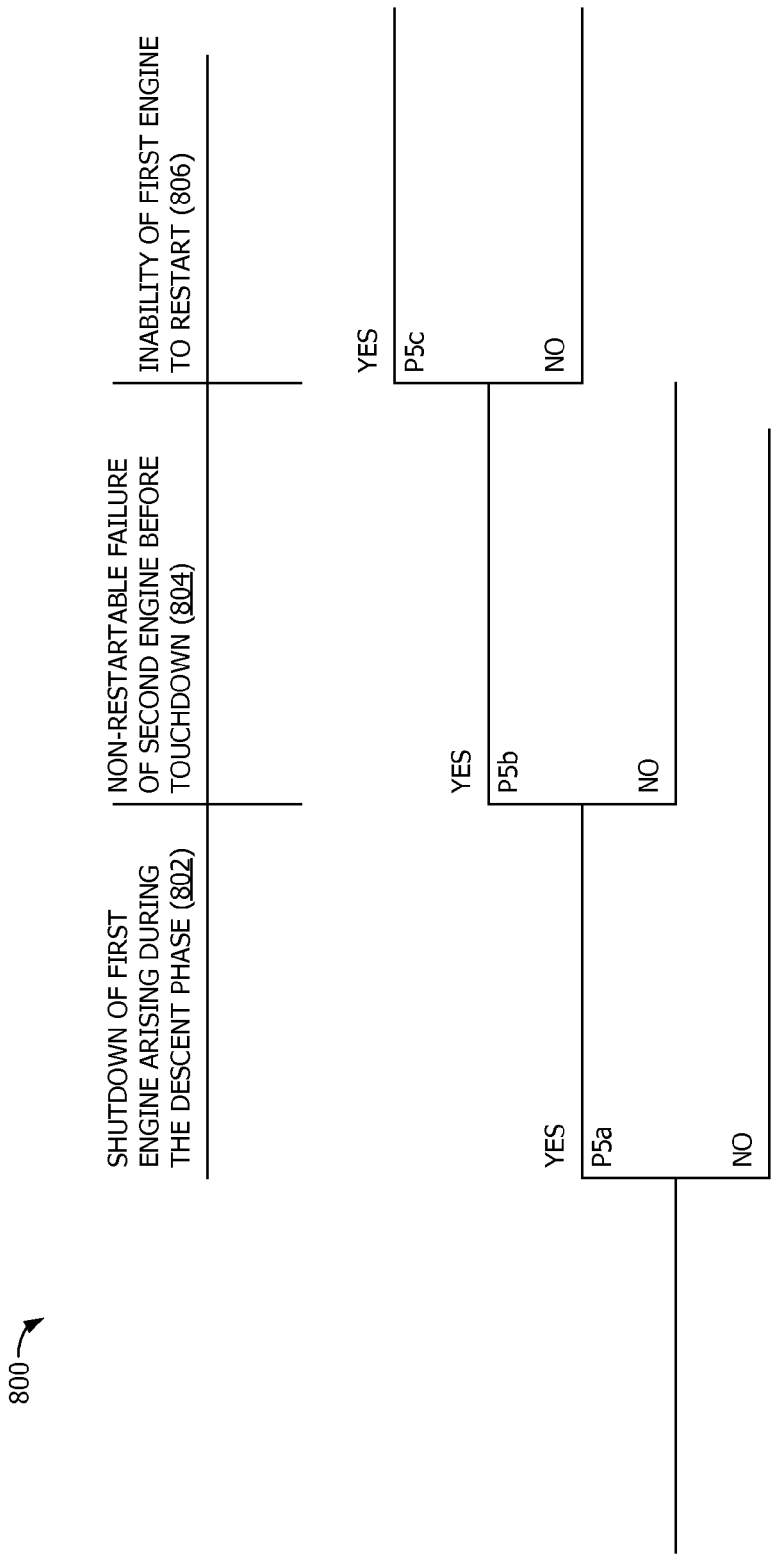

FIG. 8 illustrates an example event tree 800 for a dual independent engine shutdown sequence during the descent phase 108. As shown, a first engine operational anomaly may arise and the engine shutdown (a first event 802) with the probability:

$$P_{5a} = 2r_3 T_5 \tag{18}$$

This probability of an initial IFSD may be based on the assumption of two engines operating during descent but one engine shutting down some time in descent, and the per-engine shutdown rate during the descent phase (engine shutdowns per engine descent hour) ($r_3$), and normal time duration of the two-engine descent phase ($T_5$).

The descent phase engine shutdown rate ($r_3$) (descent IFSD rate $r_3$) (per-engine shutdown rate during the descent phase 108) may represent shutdowns per engine descent and approach hour. It may be calculated based on the given total IFSD rate ($K_F$) (either the default value or a value set by the user) times a constant (1.6) that represents a historical weighting of the descent and approach IFSD rate as compared to $K_F$. It may then be divided by 1,000 to yield a familiar IFSD rate (per 1,000 engine flight hours) and maintain consistency in the product.

One particular typical aircraft type recorded eight shutdowns between start of descent and landing in the 1,527,062 flights in the three years from 1 Jul. 2005 through 30 Jun. 2008. For the average normal time duration of two-engine descent phase time ($T_5$) of 25 minutes (0.417 hours), and accounting for two engines per aircraft, the average descent IFSD rate ($r_3$) may be calculated as follows:

Descent IFSD rate ($r_3$)=8/[(1,527,062)(2)(0.417)]= 6.28(10$^{-6}$)

Therefore, in some examples, shutdowns per engine descent hour=0.00628 per 1,000 engine flight hours in descent.

In some examples, a constant ratio of the descent IFSD rate ($r_3$) to the total IFSD rate ($K_F$) may be used to increase the total IFSD rate ($K_F$) by the historical proportion to derive the descent IFSD rate ($r_3$). For example:

Descent IFSD rate/total IFSD rate=constant (e.g., 0.00628/0.00403=1.6).

This constant ratio (divided by 1,000 to accommodate a familiar IFSD rate format) may be multiplied by $K_F$ to derive the descent IFSD rate ($r_3$) used in the specific calculation.

Returning to the descent phase dual independent engine shutdown sequence, after the first engine shutdown (first event 802), the remaining engine may shut down before landing at the destination airport (a second event 804). The probability of this second event occurring may be expressed as follows:

$$P_{5b} = (T_{A5} - K_S T_5)(K_1 K_N) r_2 + (K_S T_5 K_{ND}) r_3 \tag{19}$$

The probability ($P_{5b}$) may be that of a second IFSD after a first engine shutdown occurred in the descent phase 108.

In equation (19), $T_{A5}$ may represent the projected single-engine time to land while in the descent phase 108. As suggested above, this time may also be expressed as the descent time from single-engine cruise altitude, or rather the normal time duration of two-engine descent phase $T_5$ reduced by the factor $K_S$ (i.e., $K_S T_5$). And thus, the probability ($P_{5b}$) may be reduced to the following:

$$P_{5b} = (T_{A5} K_{ND}) r_3 \tag{19a}$$

In some examples, the projected single-engine time to land while in the descent phase ($T_{A5}$) may be calculated as $T_5/2$ (i.e., on average in the middle of descent). In these examples, the probability ($P_{5b}$) may again be expressed as:

$$P_{5b} = (r_5/2)(K_{ND}) r_3 \tag{19b}$$

This probability may therefore be based on the previous engine shutdown having arisen on average half-way through $T_5$; and thus, the time remaining to descend and touch down at the original destination airport may be $T_5/2$.

In some examples, $T_{A5}$ may have a minimum limit of zero (i.e., first engine shuts down at landing), and a maximum limit of the normal time duration of two-engine descent phase ($T_5$) (i.e., first engine shuts down at the top of descent). For a $T_5$ of 0.417 hours, for example, the average may be $T_5/2$=0.21 hours. Since little thrust may be required in the descent phase 108, a likelihood of unsatisfactory aircraft performance scenarios such as loss of thrust from single-engine or dual-engine operational anomalies may be reduced; thereby there may be less risk during the descent phase. It is possible that a second IFSD may happen during descent and the aircraft still land safely.

As also reflected above, the probability ($P_{5b}$) may be based on the engine shutdowns per engine descent hour ($r_3$), decreased by a factor of $K_{ND}$ over the first shutdown (no unnecessary IFSDs on second IFSD). In this regard, example implementations of the present disclosure may use the descent IFSD rate ($r_3$) for the first IFSD in descent. However, after this initial IFSD, when continuing to descend on a single engine, the crew may not shut down the one remaining engine down or allow the one remaining engine to stop producing thrust unless it's unavoidable. The descent IFSD rate of the second engine may therefore be reduced by $K_{ND}$.

Similar to the other phases, after the second event 804, the sequence for the descent phase 108 may include an event (a third event 806) of the first engine being unable to restart, which may occur with the probability:

$$P_{5c} = K_{ND} \tag{20}$$

Here, $K_{ND}$ may be the probability that the first engine shutdown will not be restartable.

The probability of the total thrust loss from dual independent engine shutdowns starting during the descent phase 108 ($P_5$) may be the product of the three conditional probabilities of the events of the sequence: 1) a first engine operational anomaly arises during the descent phase and the engine is shut down ($P_{5a}$); 2) the remaining engine shuts down before touchdown at the destination airport ($P_{5b}$); and 3) an inability of the first engine to restart ($P_{5c}$). It is also possible that despite losing thrust from both engines, the aircraft may land safely, since it may already be on approach when each engine shuts down. Notationally, the probability ($P_5$) may be represented as follows:

$$P_5 = P_{5a} P_{5b} P_{5c} \tag{21}$$

$$= 2r_3 T_5 [(T_{A5}/2)(K_{ND})r_3] K_{ND}$$

Or by substitution with the expression of $T_{A5}$ provided in equation (19b), the probability may be represented as:

$$P_5 = 2r_3 T_5 [(T_{A5}/2)(K_{ND})r_3] K_{ND} = (r_3 T_5 K_{ND})^2 \tag{21a}$$

Reference is again made to the ETOPS IFSD risk calculator of example implementations of the present disclosure, which may be configured to calculate risks of a dual independent engine shutdown sequence based on an event-sequence analysis probabilistic model, such as that provided above. The ETOPS IFSD risk calculator may be implemented in any of a number of different manners, such as in a system, a module of a system or the like.

Figure 9:
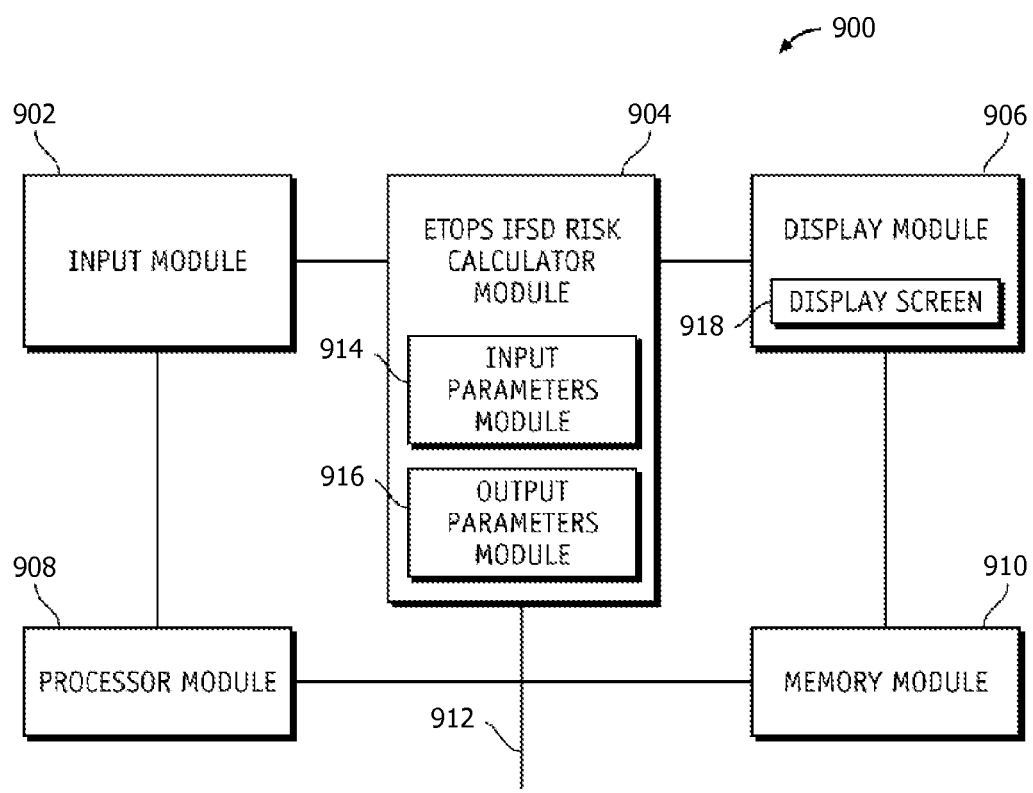
FIG. 9 is an illustration of a schematic functional block diagram of an ETOPS dual independent engine IFSD risk analyzer system, according to an example implementation.

FIG. 9 is an illustration of a schematic functional block diagram of an extended operations (ETOPS) dual independent engine in-flight shutdown (IFSD) risk analysis system 900 (system 990) according to an example implementation of the present disclosure. The system may represent, for example but without limitation, a desktop, a laptop or notebook computer, a hand-held computing device (PDA, cell phone, palmtop, etc.), a mainframe, a server, a client or any other type of special or general purpose computing device as may be desirable or appropriate for a given application or environment. For example but without limitation, the system may be part of an aircraft computer, a dedicated system on-board an aircraft, a part of a ground support computer, a dedicated ground system and the like. The system generally includes a physical housing (not shown), an input module 902, an ETOPS IFSD risk calculator module 904, a display module 906, a processor module 908 and a memory module 910.

A practical system 900 may include any number of input modules 902, any number of display modules 906, any number of processor modules 908, and any number of memory modules 910. The illustrated system depicts a simple example implementation for ease of description. These and other elements of the system may be interconnected together, allowing communication between the various elements of system. In one example implementation, these and other elements of the system may be interconnected together via a communication link 912. Those of skill in the art will understand that the various illustrative blocks, modules, circuits and processing logic described in connection with the example implementations disclosed herein may be implemented in hardware, computer-readable software, firmware or any practical combination thereof. To illustrate clearly this interchangeability and compatibility of hardware, firmware and software, various illustrative components, blocks, modules, circuits and steps are described generally in terms of their functionality. Whether such functionality is implemented as hardware, firmware or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The input module 902 may be configured to receive input parameters (FIG. 10) from a user, and send the input parameters to the ETOPS IFSD risk calculator module 904. The input module may include input means, for example but without limitation, activation keys, touchpad keys, locally or remotely accessed databases, and the like.

The ETOPS IFSD risk calculator module 904 may be configured to calculate risks associated with a dual independent engine shutdown sequence for various two-engine aircraft or ETOPS flight paths (routes) comprising the five phases of the ETOPS flight (FIG. 1). The ETOPS IFSD risk calculator module may calculate risk based on an event-sequence analysis probabilistic model, such as that described above. In this manner, the ETON IFSD risk calculator module may separately calculate risks for each of the five phases of flight, and then sum the risks to obtain the risk for the total flight. For each flight phase, the ETOPS IFSD risk calculator module may determine a probability that a first engine shutdown will be followed by a second engine shutdown (unrestartable) before the aircraft can land, and that the first engine shutdown will not be restartable. Because an event sequence in each phase is mutually exclusive of the other phases of the five phases of flight, a probability of the event sequence happening in a whole of an ETOPS flight may be the sum of probabilities in the five phases of flight. As explained above, the ETOPS IFSD risk calculator module may calculate a risk that is more accurate and demonstratively lower than a conventional risk estimate that conventional analysis and conventional risk models (equations) generally indicate, and lower than other known risks. When viewed relative to an appropriate preexisting baseline, this lower risk may establish availability of an aircraft for an ETOPS flight, or an ETOPS flight path for an aircraft. And this established availability may in turn justify the regulators longer ETOPS rule times, which may result in shorter flights, reduced fuel consumption, and higher payload range for two-engine ETOPS operations.

The ETOPS IFSD risk calculator module 904 may be configured to receive a performance data set of a two-engine aircraft/engine combination, and use the performance data along with specific data entered by the user (a user input variable array) to calculate the risk of a dual independent engine shutdown sequence.

For example, the ETOPS IFSD risk calculator module 904 may include an input parameter module 914 and an output parameters module 916. Parameters relevant to experience on a specific aircraft model may be entered in to the input parameter module via the input module 902 to more accurately portray an actual risk. The user may easily change any input parameter (FIG. 10) and substantially immediately calculate output parameters (FIGS. 11 and 12) via the output parameters module to observe how risk is affected on any phase (FIG. 1) of the flight, or the flight as a whole. The display module 906 may include a display screen 918 formed by, for example but without limitation, an organic electro-luminescence (OEL) panel, liquid crystal panel (LCD) and the like. And the output from the output parameters module may be graphically and/or numerically automatically displayed (FIGS. 13, 14 and 15) on the display screen for easy understanding as explained in more detail below.

In this manner, effects of small changes on parameters that substantially affect risk may be evaluated according to example implementations of the present disclosure. In contrast, current risk models (equations) may generally be overly conservative due to inflexibility and inability to accommodate most parameters, and cumbersome to use.

In one example implementation, the ETOPS IFSD risk calculator module 904 may perform the risk calculation in real-time using in-flight performance parameters for one or more input parameters (FIG. 10). The ETOPS IFSD risk calculator module may be used, for example but without limitation, in an aircraft/in-flight computer, in a ground support computer, in a computer at regulatory agencies, and the like, and may be used when a change in aircraft systems occurs during in-flight operations. For example, pilots may perform the calculations in real-time using the ETOPS IFSD risk calculator module. Ground operators may also perform the same calculations to confirm and verify the calculations performed by the pilot. The in-flight computer and the ground support computer may communicate with each other to compare and verify results of the calculations. In this manner, pilots, ground operators and ground authorities may determine whether to land the aircraft to avail themselves of service opportunities that can ensure satisfactory aircraft performance.

The display module 906 may be configured to display input and output parameters of the system 900. The display module may display an image based on input parameters (FIG. 10) and output parameters (FIGS. 11 and 12) of the ETOPS IFSD risk calculator module 904. The display module may accept a user input operation to input and transmit data, and input operation commands for functions provided in the system. The display module may accept the operation command, and output operation command information to the processor module 908 in response to the accepted operation command. Various kinds of information may be displayed on the display screen 918 of the display module via an image/video signal supplied from the processor module. For example, input/output parameters of the ETOPS IFSD risk calculator module may be graphically displayed (FIGS. 13 and 14) and numerically displayed (FIG. 15) on the display screen as explained in more detail below in the context of discussion of FIGS. 13, 14 and 15.

The processor module 908 may be configured to support functions of the EROS IFSD risk calculator module 904. For example, the processor module may control operations of the system 900 so that processes of the system are suitably performed. These processes may include, for example hut without limitation, controlling input/output parameters data signals to/from the ETON IFSD risk calculator module, performing calculation of landing times and probability values of total thrust loss for various phases of the ETOPS flight based on various equations as explained herein, controlling the display module 906 to display input/output parameters, and the like. In this manner, the processor module may use the ETOPS IFSD risk calculator to calculate a more accurate and lower risk than a conventional risk estimate, which when viewed relative to an appropriate preexisting baseline, may justify longer ETOPS rule times and allow shorter flights, reduced fuel consumption, higher payload range and lower flight times for two-engine ETOPS operations in a fast and efficient manner as explained in more detail herein.

The processor module 908 may also access the memory module 910 such as to access to the input parameters such as the two-engine aircraft/engine combination performance data set, the user input variable array, and the flight times. The processor module may be implemented or realized with a general purpose processor, a content addressable memory, a digital signal processor (DSP), an application specific integrated circuit (ASIC), a field programmable gate array (FPGA), any suitable programmable logic device, discrete gate or transistor logic, discrete hardware components or any combination thereof, designed to perform the functions described herein. In this manner, a processor may be realized as a microprocessor, a controller, a microcontroller, a state machine or the like. A processor may also be implemented as a combination of computing devices, e.g., a combination of a digital signal processor and a microprocessor, a plurality of microprocessors, one or more microprocessors in conjunction with a digital signal processor core or any other such configuration. In practice, the processor module may include processing logic configured to carry out the functions, techniques, and processing tasks associated with the operation of system 900. In particular, the processing logic may be configured to support risk calculation of the ETOPS IFSD risk calculator module 904 described herein.

The memory module 910 may be any suitable data storage area with suitable amount of memory formatted to support the operation of the system 900. The memory module may be configured to store, maintain and provide data as needed to support the functionality of the system in the manner described herein. In practical example implementations, the memory module may include, for example but without limitation, a non-volatile storage device (non-volatile semiconductor memory, hard disk device, optical disk device and the like), a random access storage device (for example, SRAM, DRAM) or any other form of storage medium known in the art. The memory module may be coupled to the processor module 908 and configured to store, for example but without limitation, the input parameter values and the output parameter values corresponding to the risk assessment scenario.

The memory module 910 may store, for example but without limitation, input from a user to the ETOPS IFSD risk calculator module 904 such as the user input variable array, output from the ETOPS IFSD risk calculator module such as the probability values, and the like, as explained in more detail below in the context of discussion of FIGS. 10, 11 and 12. Additionally, the memory module may represent a dynamically updating database containing a table for the purpose of using the ETOPS IFSD risk calculator module. The memory module may also store a computer program that is executed or otherwise executable by the processor module 908, an operating system, an application program, tentative data used in executing a program processing, and the like. The memory module may be coupled to the processor module such that the processor module may read information from and write information to the memory module. As an example, the processor module and memory module may reside in their respective ASICs. The memory module may also be integrated into the processor module. In an example implementation, the memory module may include a cache memory for storing temporary variables or other intermediate information during execution of instructions to be executed by the processor module.

FIG. 10 is an illustration of an example input parameter table 1000 of the ETOPS IFSD risk calculator module 904 according to an example implementation of the present disclosure. The input parameter table may include a current value column 1002, a range column 1004, and an optional default values column 1006. In the example implementation shown in FIG. 10, the input parameter table includes input data comprising, for example but without limitation, a predetermined (or predefined) two-engine aircraft/engine combination performance data set (flight specific data), the user input parameters such as parameters for the specific two-engine aircraft/engine combination on an ETOPS flight (aircraft model specific parameters), average engine in-flight shutdown rates for various flight phases, flight times calculated by the ETOPS IFSD risk calculator module for various flight phases (calculated flight times), and the like.

The current value column 1002 shows input data values that the ETOPS IFSD risk calculator module 904 may be currently using to calculate the risks. The current value column may include predetermined default values of the input data. The user may modify the data in the current value column with any values within the ranges shown in the range column 1004. In one example implementation, the user may manually enter input parameters associated with a specific aircraft model. Alternatively, the input parameters for each aircraft model may be automatically input. In this manner, the input parameters for each aircraft model may be input a priori and accessed by the system 900 in response to user selection of the aircraft model for example.

The parameters for a specific two-engine aircraft/engine model on an ETOPS flight (aircraft model specific parameters) may be established by experience, and may include, for example but without limitation: a ratio of hard climb IFSD rate to total climb IFSD rate ($K_{N1}$), a ratio of hard cruise IFSD rate to total cruise IFSD rate ($K_N$), a ratio of hard descent IFSD rate to total descent IFSD rate ($K_{ND}$), a ratio of single-engine descent time to two-engine descent time ($K_S$), and the like. A user may enter any desired value for IFSD rates in the input parameter module 914, and shutdown rates and risks in all phases will adjust proportionately in the ETOPS IFSD risk calculator module 904.

Default values for the aircraft model specific parameters on the ETOPS flight which may be set at predetermined default values and stored in the memory module 910, may be accepted by the user or adjusted as necessary. For example but without limitation, as shown in the current value column 1002, a default value of $K_N$ may be set to 0.78, a default value of $K_{ND}$ may be set to 1, a default value of $K_{N1}$ may be set to 0.87, and a default value of $K_S$ may be set to 0.6.

Once the aircraft model specific parameters are entered into the memory module 910, the flight specific data may be entered in order for risks to be calculated as explained in more detail herein.

The predetermined two-engine aircraft/engine combination performance data set (flight specific data) may include, for example but without limitation, planned total flight time ($T_T$), ETOPS rule time ($T_R$), ETOPS threshold time ($T_E$), average duration of the climb phase ($T_1$), projected time to land following an engine shutdown while in the climb phase ($T_{A1}$), normal time duration of non-ETOPS early-cruise phase ($T_2$), normal time duration of non-ETOPS late-cruise phase time ($T_4$), normal time duration of two-engine descent phase time ($T_5$), average total-flight IFSD rate per engine flight hour ($K_F$) (user setable IFSD rate), single-engine-cruise shutdown-stress factor ($K_1$), and the like.

Default values of the flight specific data shown in the current value column 1002, which may be set at predetermined default values and stored in the memory module 910, may be accepted by the user or adjusted as necessary. For example, as shown in the current value column, the planned total flight time $T_T$ may be set by the user to 9.1 hours. The default values of: $T_E$ may be equal to 1 hour, $T_R$ may be equal to 3 hours (180-minute ETOPS), $T_1$ may be equal to 0.333 hours, $T_{A1}$ may be equal to 0.7 hours, $T_2$ may be equal to 2 hours, $T_4$ may be equal to 2 hours, and $T_5$ may be equal to 0.417 hours. And the planned total flight time $T_T$ may be equal to a sum of the durations of all individual phases: $T_T = T_1 + T_2 + T_3 + T_4 + T_5$.

The ETOPS IFSD risk calculator module 904 may be used to perform calculations for various two-engine aircraft or ETOPS flight paths (routes). The ETOPS IFSD risk calculator module may considerably expedite verification of calculations as described herein.

The ETOPS IFSD risk calculator module 904 may calculate flight times including, for example but without limitation, projected single-engine time to land while in the non-ETOPS early-cruise phase ($T_{A2}$), normal time duration of the ETOPS Phase ($T_3$), projected single-engine time to land while in the ETOPS Phase ($T_{A3}$), projected single-engine time to land while in the non-ETOPS late-cruise phase ($T_{A4}$), projected single-engine time to land while in the descent phase ($T_{A5}$), and the like.

Figure 11:
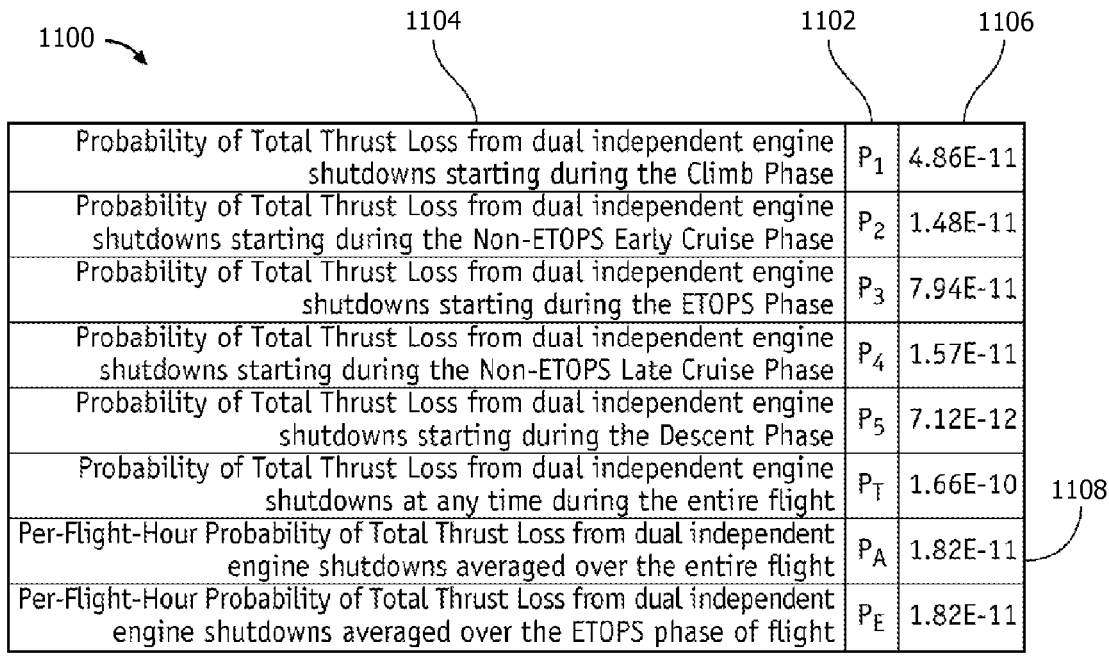
FIG. 11 is an illustration of an example output parameter table of an ETOPS IFSD risk calculator module, according to an example implementation.

FIG. 11 is an illustration of an example output parameter table 1100 of the ETOPS IFSD risk calculator system 900 showing probabilities in column 1102 and 1104 and their calculated values in column 1106, according to an example implementation of the present disclosure. The output parameter table may include values indicating, for example but without limitation: the probability of a total thrust loss from dual independent engine shutdowns starting during the climb phase ($P_1$), the probability of total thrust loss from dual independent engine shutdowns starting during the non-ETOPS early-cruise phase ($P_2$), the probability of total thrust loss from dual independent engine shutdowns starting during the ETOPS phase ($P_3$), the probability of total thrust loss from dual independent engine shutdowns starting during the non-ETOPS late-cruise phase ($P_4$), the probability of total thrust loss from dual independent engine shutdowns starting during the descent phase ($P_5$), the probability of total thrust loss from dual independent engine shutdowns starting at any time during the entire ETOPS flight (total probability) ($P_T$), and the like.

Additionally or alternatively, for example, the output parameter table may include values indicating the per-flight-hour probability of total thrust loss from dual independent engine shutdowns, averaged over the entire flight ($P_A$), the per-flight-hour probability of total thrust loss from dual independent engine shutdowns, averaged over the ETOPS phase ($P_E$), and the like.

The probability ($P_A$) may be a calculated average per-flight-hour probability of a complete and permanent loss of aircraft thrust, averaged over the entire flight 100 (FIG. 1). The probability ($P_A$) may be a per-flight-hour probability of total thrust loss from dual independent engine shutdowns averaged over the entire flight. It may be equal to the total probability ($P_T$) divided by the planned total flight time ($T_T$), or notationally, $P_A = P_T / T_T$.

The probability ($P_E$) may be a calculated per-flight-hour probability of a complete and permanent loss of aircraft thrust only in the ETOPS phase 112 (FIG. 1) of flight. The probability ($P_E$) may be a per-flight-hour probability of total thrust loss from dual independent engine shutdowns averaged over the ETOPS phase of flight. It may be equal to the probability ($P_3$) divided by the duration ($T_3$) of the ETOPS phase, or notationally, $P_E = P_3 / T_3$.

Figure 12:
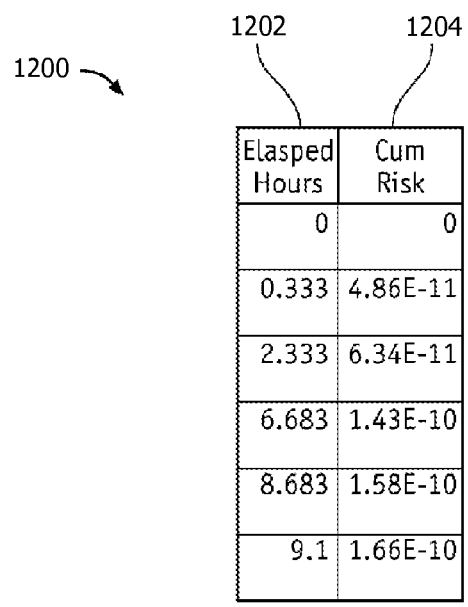
FIG. 12 is an illustration of an example output parameter table of an ETOPS IFSD risk calculator module presented on a display, according to an example implementation.
Figure 16:
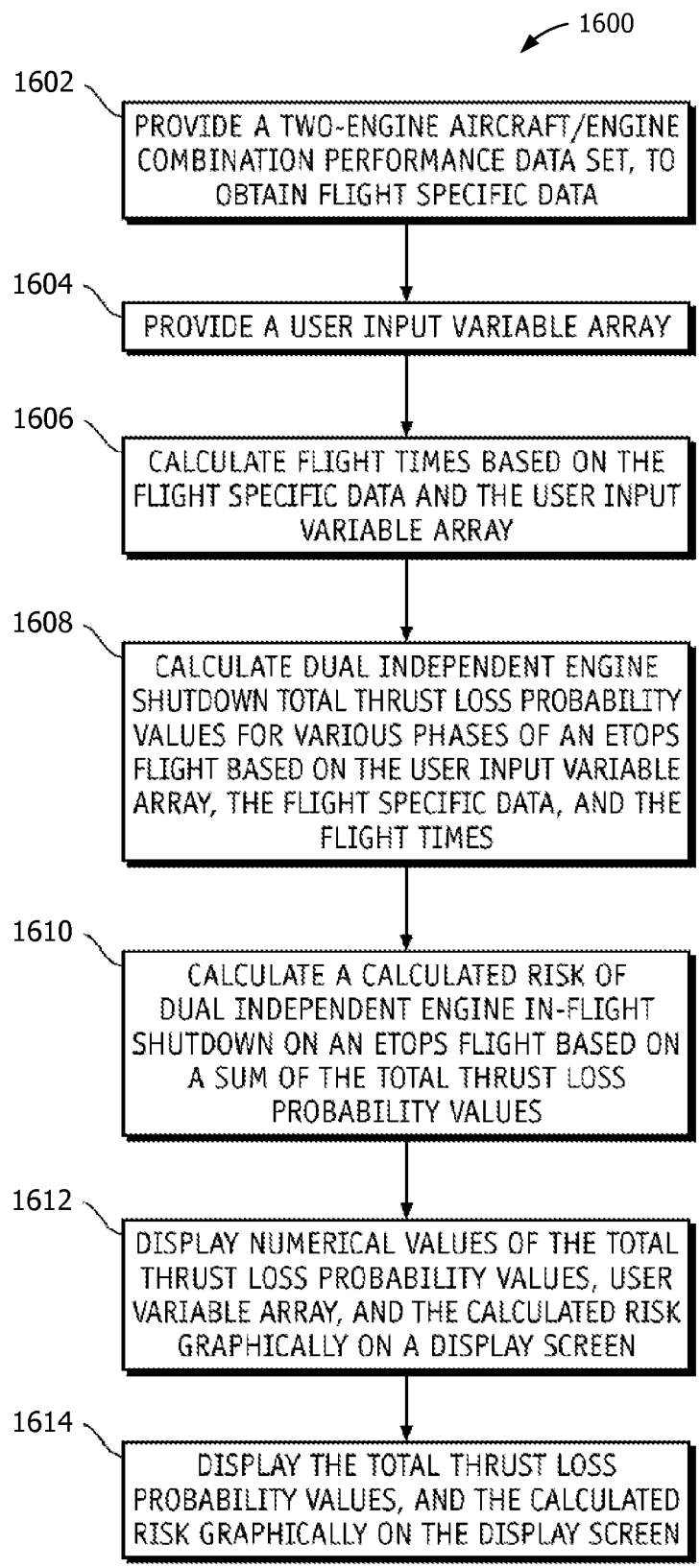

FIG. 12 is an illustration of the example output parameter table 1200 of the ETOPS IFS') risk calculator module 904 showing cumulative risk progression values according to an example implementation of the present disclosure. Column 1202 shows the elapsed flight time in hours, and column 1204 shows values of cumulative risk at the end of each phase of flight calculated by the ETOPS IFSD risk calculator module. For example, at elapsed time 0.333 hours (the end of the climb phase 106), the cumulative risk may be equal to the climb phase risk ($P_1$). At elapsed time 2.333 hours (the end of the non-ETOPS early-cruise phase 110), the cumulative risk may be equal to the non-ETOPS early-cruise phase risk ($P_2$) added to $P_1$. At elapsed time 6.683 hours (the end of the ETOPS phase 112), the cumulative risk may be equal to ETOPS phase risk ($P_3$) added to $P_2$ and $P_1$. At elapsed time 8.683 hours (the end of the non-ETOPS late-cruise phase 114), the cumulative risk may be equal to non-ETOPS late-cruise phase risk ($P_4$) added to $P_3$, $P_2$ and $P_1$. In addition, the cumulative risk ($P_T$) may be the descent phase risk ($P_5$) added to $P_4$, $P_3$, $P_2$ and $P_1$. The cumulative probabilities calculated by the ETOPS IFSD risk calculator module shown in FIG. 12 are in order of $10^{-10}$, which may be substantially less than $10^{-9}$ value considered acceptable for aircraft operations. This lower risk demonstrated by the ETOPS IFSD risk calculator module may encourage and enable regulators to allow longer ETOPS rule times, which may result in shorter flights, requiring less fuel and time. FIGS. 13 and 14 show the cumulative risks presented on a display screen 918, which may at least partially establish availability of an aircraft or ETOPS flight lath according to example implementations.

FIG. 13 is an illustration of example graphical output 1300 of the summed risks, shown in the output parameter table of FIG. 12, presented on the display screen 918 using a bar chart graph according to an example implementation of the present disclosure. FIG. 13 shows the individual risks for the climb phase 1302/106, the non-ETOPS early-cruise phase 1304/110, the ETOPS phase 1306/112, the non-ETOPS late-cruise phase 1308/114, and the descent phase 1310/108.

FIG. 14 is an illustration of an example graphical output 1400 of the cumulative risk progression of all phases of an ETOPS flight 100, driven by the output parameter table of FIG. 12 and presented on the display screen 918 using a linear graph 1402 according to an example implementation of the present disclosure. Steeper rises may equate to faster accumulation of risk.

FIG. 15 is an illustration of example parameter table 1500 presented on the display screen 918 according to an example implementation of the present disclosure. The parameter table may be derived from the input parameter table 1000 (i.e., from the current column 1002) and the output parameter table 1100 (i.e., $P_A$ 1108) presented as a convenience for the user, so the parameters may be properly associated with the graphs. In some examples, the table or parameters provided by the table may at least partially establish availability of an aircraft or ETOPS flight path according to example implementations (alone or in combination with the outputs of either or both of FIG. 13 or 14).

FIGS. 16-22 are illustrations of example flow charts showing a process 1600 and sub-processes 1700, 1800, 1900, 2000, 2100 and 2200 (each a process) for analyzing a risk of extended operations (ETOPS) dual independent engine in-flight shutdown (IFSD) that may be used suitably by the ETOPS IFSD risk analyzer system 900, according to an example implementation of the present disclosure. The various tasks performed in connection with the process may be performed by software, hardware, firmware, a computer-readable medium having computer executable instructions for performing the process method or any combination thereof. The process may be recorded in a computer-readable medium such as a semiconductor memory, a magnetic disk, an optical disk and the like, and may be accessed and executed, for example, by a computer CPU such as the processor module 908 in which the computer-readable medium is stored. It should be appreciated that the process may include any number of additional or alternative tasks, the tasks shown in FIG. 16 need not be performed in the illustrated order, and the process may be incorporated into a more comprehensive procedure or process having additional functionality not described in detail herein.

For illustrative purposes, the following description of the process 1600 may refer to elements mentioned above in connection with FIGS. 1 and 4-15. In practical example implementations, portions of the process may be performed by different elements of the system 900 such as the input module 902, the ETOPS IFSD risk calculator module 904, the display module 906, the processor module 908 and the memory module 910. The process may have functions, material and structures that are similar to the example implementations shown in FIGS. 1-15. Therefore common features, functions and elements may not be redundantly described here.

The process 1600 may begin by providing a two-engine aircraft/engine combination performance data set to obtain the flight specific data (task 1602), as explained above.

The process 1600 may then continue by providing a user input variable array (task 1604) as explained above. The user input variable array may at least include an average engine in-flight shutdown rate, an average duration of the climb phase 106, an ETOPS rule time ($T_R$) 120; and the planned total flight time ($T_T$).

The process 1600 may then continue by calculating flight times based on the user input variable array and the flight specific data for various flight phases (task 1606).

The process 1600 may then continue by calculating dual independent engine shutdown total thrust loss probability values for various phases of the ETOPS flight based on the user input variable array, the flight specific data, and the flight times (task 1608). FIGS. 17-21 illustrate example sub-processes 1700, 1800, 1900, 2000, 2100 according to which the probability values may be calculated for the climb phase 106, non-ETOPS early-cruise phase 110, ETOPS phase 112, non-ETOPS late-cruise phase 114 and descent phase 108, respectively.

As shown in FIG. 17, the sub-process 1700 for the climb phase may include calculating the probability of shutdown of a first engine arising the climb phase (task 1702), such as in accordance with the aforementioned equation (2). The probability of a non-restartable failure of the second engine before touchdown may be calculated (task 1704), such as in accordance with equation (3); and the probability of an inability of the first engine to restart may be calculated (task 1706), such as in accordance with equation (4). The sub-process 1700 may then continue by calculating the probability of the respective failure sequence during the climb phase (task 1708), such as in accordance with equation (5).

As shown in FIG. 18, the sub-process 1800 for the non-ETOPS early-cruise phase 110 may include calculating the probability of shutdown of a first engine arising the non-ETOPS early-cruise phase (task 1802), such as in accordance with the aforementioned equation (6). The probability of a non-restartable failure of the second engine before touchdown may be calculated (task 1804), such as in accordance with equation (7) or equation (7a); and the probability of an inability of the first engine to restart may be calculated (task 1806), such as in accordance with equation (8). The sub-process 1800 may then continue by calculating the probability of the respective failure sequence during the non-ETOPS early-cruise phase (task 1808), such as in accordance with equation (9) or equation (9a).

As shown in FIG. 19, the sub-process 1900 for the ETOPS phase 112 may include calculating the probability of shutdown of a first engine arising the ETOPS phase (task 1902), such as in accordance with the aforementioned equation (10). The probability of a non-restartable failure of the second engine before touchdown may be calculated (task 1904), such as in accordance with equation (11) or equation (11a); and the probability of an inability of the first engine to restart may be calculated (task 1906), such as in accordance with equation (12). The sub-process 1900 may then continue by calculating the probability of the respective failure sequence during the ETOPS phase (task 1908), such as in accordance with equation (13) or equation (13a).

As shown in FIG. 20, the sub-process 2000 for the non-ETOPS late-cruise phase 114 may include calculating the probability of shutdown of a first engine arising the non-ETOPS late-cruise phase (task 2002), such as in accordance with the aforementioned equation (14). The probability of a non-restartable failure of the second engine before touchdown may be calculated (task 2004), such as in accordance with equation (15) or equation (15a); and the probability of an inability of the first engine to restart may be calculated (task 2006), such as in accordance with equation (16). The sub-process 2000 may then continue by calculating the probability of the respective failure sequence during the non-ETOPS late-cruise phase (task 2008), such as in accordance with equation (17) or equation (17a).

As shown in FIG. 21, the sub-process 2100 for the descent phase 108 may include calculating the probability of shutdown of first engine arising the descent phase (task 2102), such as in accordance with the aforementioned equation (18). The probability of a non-restartable failure of the second engine before touchdown may be calculated (task 2104), such as in accordance with equation (19), equation (19a) or equation (19b); and the probability of an inability of the first engine to restart may be calculated (task 2106), such as in accordance with equation (20). The sub-process 2100 may then continue by calculating the probability of the respective failure sequence during the descent phase (task 2108), such as in accordance with equation (21) or equation (21a).

Returning to FIG. 16, the process 1600 may then continue by calculating a risk of dual independent engine in-flight shutdown (IFSD) on the ETOPS flight based on the total thrust loss probability values (task 1610) using ETOPS IFSD risk calculation means such as the ETOPS IFSD risk calculator module 904. FIG. 22 illustrates an example sub-process 2200 according to which the risk may be calculated.

As shown in FIG. 22, the sub-process 2200 may include calculating the probability ($P_T$) of the failure sequence during the ETOPS flight (task 2202), such as by summing the probabilities of the sequence during each of the flight's phases 106, 110, 112, 114 and 108 in accordance with equation (1). In some examples, the sub-process 2200 may additionally or alternatively calculate the probability per-flight-hour (task 2204), such as in accordance with the aforementioned $P_A = P_T / T_T$.

Returning to FIG. 16, the process 1600 may then continue by displaying a numerical value of the total thrust loss probability values, the user variable array, and the calculated risk on the display screen 918 (task 1612).

The process 1600 may then continue by displaying the total thrust loss probability values, the user variable array, and the calculated risk graphically on the display screen 918 (task 1614). This may establish availability of an aircraft for an ETOPS flight, or an ETOPS flight path for an aircraft, particularly when viewed relative to an appropriate preexisting baseline, such as may be provided by appropriate ETOPS regulations.

In this way, various example implementations of the present disclosure may encourage and enable aircraft regulators to allow more aircraft and flight paths with longer ETON rule times, which may result in shorter flights, reduced fuel consumption, higher payload range and lower flight times for two-engine ETOPS operations. The example implementations provide a fast method for regulators, operators, aircraft manufacturers and engine manufacturers to observe an actual effect of many flight parameters on the risk of a dual independent engine failure sequence during ETOPS operations. Regulators can confidently approve ETOPS operations around the world. Operators can apply for new operations, showing their regulators how safe they can be. Manufacturers can get approval for more and longer ETOPS operations for their aircraft.

While at least one example implementation has been presented in the foregoing detailed description, it should be appreciated that a vast number of variations exist. It should also be appreciated that the example implementation or implementations described herein are not intended to limit the scope, applicability or configuration of the subject matter in any way. Rather, the foregoing detailed description will provide those skilled in the art with a convenient road map for implementing the described example implementation or implementations. It should be understood that various changes can be made in the function and arrangement of elements without departing from the scope defined by the claims, which includes known equivalents and foreseeable equivalents at the time of filing this patent application.

In this document, the term "module" may refer to software, firmware, hardware and any combination of these elements for performing the associated functions described herein. Additionally, for purpose of discussion, the various modules are described as discrete modules; however, as may be apparent one of skilled in the art, two or more modules may be combined to form a single module that performs the associated functions according the example implementations of the present disclosure.

In this document, the terms "computer program product," "computer-readable medium," and the like may be used generally to refer to media such as, for example, memory, storage devices or storage unit. These and other forms of computer-readable media may be involved in storing one or more instructions for use by the processor module 908 to cause the processor module to perform specified operations. Such instructions, generally referred to as "computer program code" or "program code" (which may be grouped in the form of computer programs or other groupings), when executed, enable the method of analyzing the risk of extended operations (ETOPS) dual independent engine in-flight shutdown (IFSD) using the ETOPS IFSD risk calculation means of the system 900.

The above description may refer to elements or nodes or features being "connected" or "coupled" together. As used herein, unless expressly stated otherwise, "connected" may mean that one element/node/feature is directly joined to (or directly communicates with) another element/node/feature, and not necessarily mechanically. Likewise, unless expressly stated otherwise, "coupled" may mean that one element/node/feature is directly or indirectly joined to (or directly or indirectly communicates with) another element/node/feature, and not necessarily mechanically. Thus, although FIGS. 1-15 depict example arrangements of elements, additional intervening elements, devices, features or components may be present in an example implementation of the present disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide example instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal or standard technologies that may be available or known now or at any time in the future. Likewise, a group of items linked with the conjunction "and" should not be read as requiring that each and every one of those items be present in the grouping, but rather should be read as "and/or" unless expressly stated otherwise.

Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of establishing availability of an Extended Operations (ETOPS) flight path for a predefined two-engine aircraft including a first engine and a second engine, the method comprising:

calculating a probability of a dual independent engine shutdown sequence of the predefined two-engine aircraft for each of a climb phase, a plurality of cruise phases including an ETOPS phase, and a descent phase into which the ETOPS flight is divisible, the dual independent engine shutdown sequence being composed of a sequence of events that for each phase includes events having respective, conditional probabilities a product of which is the probability of the shutdown sequence for the phase, the conditional probability for the ETOPS phase being specific to an ETOPS rule time for the ETOPS flight path;

calculating a risk of the dual independent engine shutdown sequence during the ETOPS flight as a function of a sum of the probabilities for the phases; and establishing availability of the ETOPS flight path that the predefined two-engine aircraft will follow, the availability being established based on the risk and a preexisting baseline, wherein the ETOPS flight includes takeoff from an origin airport and touchdown at a destination airport, and the dual independent engine shutdown sequence is composed of a sequence of events that for each phase includes in sequence, a first event of shutdown of the first engine during the ETOPS flight, a second event of a non-restartable shutdown of the second engine before touchdown at the destination airport or an alternate airport, and a third event of an inability of the first engine to restart, and wherein the method further comprises calculating the conditional probability of the third event for each phase as the ratio of a non-restartable engine shutdown rate to total engine shutdown rate for the phase.

2. The method of claim 1, wherein the method further comprises calculating the conditional probability of the first event for each phase as a function of a product of an engine shutdown rate for and a time duration of the phase.

3. The method of claim 2 further comprising:

receiving input including at least the engine shutdown rate for each phase, the engine shutdown rate for a phase being a function of a historical weighting of engine shutdown rates for the respective phase, the historical weighting being specific to a model of the predefined two-engine aircraft.

4. The method of claim 1, wherein the method further comprises calculating the conditional probability of the second event for each phase as a function of a projected time duration to touchdown at the destination airport or alternate airport.

5. The method of claim 1 further comprising:

receiving input including at least the ratio of a non-restartable engine shutdown rate to total engine shutdown rate for each phase, the ratio of a non-restartable engine shutdown rate to total engine shutdown rate for each phase being established by experience and specific to a model of the predefined two-engine aircraft.

6. A system for establishing availability of an Extended Operations (ETOPS) flight path for a predefined two-engine aircraft including a first engine and a second engine, the system comprising:

an ETOPS in-flight shutdown (IFSD) risk calculator module, executed by a processor module, which when executed is configured to calculate a probability of a dual independent engine shutdown sequence of the predefined two-engine aircraft for each of a climb phase, a plurality of cruise phases including an ETOPS phase, and a descent phase into which the ETOPS flight is divisible, the dual independent engine shutdown sequence being composed of a sequence of events that for each phase includes events having respective, conditional probabilities a product of which is the probability of the shutdown sequence for the phase, the conditional probability for the ETOPS phase being specific to an ETOPS rule time for the ETOPS flight path, wherein the ETOPS IFSD risk calculator module is also configured to calculate a risk of the dual independent engine shutdown sequence during the ETOPS flight as a function of a sum of the probabilities for the phases; and a display module configured to establish availability of the ETOPS flight path that the predefined two-engine aircraft will follow, the availability being established based on the risk and a preexisting baseline, wherein the ETOPS flight includes takeoff from an origin airport and touchdown at a destination airport, and the dual independent engine shutdown sequence is composed of a sequence of events that for each phase includes in sequence, a first event of shutdown of the first engine during the ETOPS flight, a second event of a non-restartable shutdown of the second engine before touchdown at the destination airport or an alternate airport, and a third event of an inability of the first engine to restart, and wherein the ETOPS IFSD risk calculator module is further configured to calculate the conditional probability of the third event for each phase as the ratio of a non-restartable engine shutdown rate to total engine shutdown rate for the chase.

7. The system of claim 6, wherein
the ETOPS IFSD risk calculator module is further configured to calculate the conditional probability of the first event for each phase as a function of a product of an engine shutdown rate for and a time duration of the phase.

8. The system of claim 7 further comprising:
an input module configured to receive input including at least the engine shutdown rate for each phase, the engine shutdown rate for a phase being a function of a historical weighting of engine shutdown rates for the respective phase, the historical weighting being specific to a model of the predefined two-engine aircraft.

9. The system of claim 6, wherein
the ETOPS IFSD risk calculator module is further configured to calculate the conditional probability of the second event for each phase as a function of a projected time duration to touchdown at the destination airport or alternate airport.

10. The system of claim 6 further comprising:
an input module configured to receive input including at least the ratio of a non-restartable engine shutdown rate to total engine shutdown rate for each phase, the ratio of a non-restartable engine shutdown rate to total engine shutdown rate for each phase being established by experience and specific to a model of the predefined two-engine aircraft.

11. A storage medium for establishing availability of an Extended Operations (ETOPS) flight path for a predefined two-engine aircraft including a first engine and a second engine, the storage medium being non-transitory and having computer-readable program code stored therein that, in response to execution by a processor, cause a system to at least:
calculate a probability of a dual independent engine shutdown sequence of the predefined two-engine aircraft for each of a climb phase, a plurality of cruise phases including an ETOPS phase, and a descent phase into which the ETOPS flight is divisible, the dual independent engine shutdown sequence being composed of a sequence of events that for each phase includes events having respective, conditional probabilities a product of which is the probability of the shutdown sequence for the phase, the conditional probability for the ETOPS phase being specific to an ETOPS rule time for the ETOPS flight path;
calculate a risk of the dual independent engine shutdown sequence during the ETOPS flight as a function of a sum of the probabilities for the phases; and
establish availability of the ETOPS flight path that the predefined two-engine aircraft will follow, the availability being established based on the risk and a preexisting baseline, wherein the ETOPS flight includes takeoff from an origin airport and touchdown at a destination airport, and the dual independent engine shutdown sequence is composed of a sequence of events that for each phase includes in sequence, a first event of shutdown of the first engine during the ETOPS flight, a second event of a non-restartable shutdown of the second engine before touchdown at the destination airport or an alternate airport, and a third event of an inability of the first engine to restart, and wherein the storage medium has further computer program code stored therein that, in response to execution by the processor, causes the system to further calculate the conditional probability of the third event for each phase as the ratio of a non-restartable engine shutdown rate to total engine shutdown rate for the phase.

12. The storage medium of claim 11, wherein
the storage medium has further computer program code stored therein that, in response to execution by the processor, causes the system to further calculate the conditional probability of the first event for each phase as a function of a product of an engine shutdown rate for and a time duration of the phase.

13. The storage medium of claim 12, wherein the storage medium has further computer program code stored therein that, in response to execution by the processor, causes the system to further:
receive input including at least the engine shutdown rate for each phase, the engine shutdown rate for a phase being a function of a historical weighting of engine shutdown rates for the respective phase, the historical weighting being specific to a model of the predefined two-engine aircraft.

14. The storage medium of claim 11, wherein
the storage medium has further computer program code stored therein that, in response to execution by the processor, causes the system to further calculate the conditional probability of the second event for each phase as a function of a projected time duration to touchdown at the destination airport or alternate airport.

15. The storage medium of claim 11, wherein the storage medium has further computer program code stored therein that, in response to execution by the processor, causes the system to further:
receive input including at least the ratio of a non-restartable engine shutdown rate to total engine shutdown rate for each phase, the ratio of a non-restartable engine shutdown rate to total engine shutdown rate for each phase being established by experience and specific to a model of the predefined two-engine aircraft.

* * * * *